(12) United States Patent
Agarwal

(10) Patent No.: US 11,174,104 B2
(45) Date of Patent: Nov. 16, 2021

(54) METHOD AND SYSTEM FOR TRANSPORTING PAYLOADS IN STORAGE FACILITIES

(71) Applicant: GREY ORANGE PTE. LTD., Singapore (SG)

(72) Inventor: Ankit Agarwal, Kanpur (IN)

(73) Assignee: GREY ORANGE PTE. LTD., Singapore (SG)

( * ) Notice: Subject to any disclaimer, the term of this patent is extended or adjusted under 35 U.S.C. 154(b) by 162 days.

(21) Appl. No.: 16/657,782

(22) Filed: Oct. 18, 2019

(65) Prior Publication Data

US 2021/0114809 A1 Apr. 22, 2021

(51) Int. Cl.
  *B65G 1/137* (2006.01)
  *B65G 1/04* (2006.01)
  *B65G 1/06* (2006.01)

(52) U.S. Cl.
  CPC ......... *B65G 1/1371* (2013.01); *B65G 1/0492* (2013.01); *B65G 1/065* (2013.01)

(58) Field of Classification Search
  CPC combination set(s) only.
  See application file for complete search history.

(56) References Cited

U.S. PATENT DOCUMENTS

| | | | |
|---|---|---|---|
| 9,446,512 B1 * | 9/2016 | Moses | G05D 1/0088 |
| 10,336,150 B1 | 7/2019 | Hebert et al. | |
| 10,579,071 B1 * | 3/2020 | Li | G05D 1/0289 |
| 2012/0158176 A1 * | 6/2012 | Park | B25J 9/1617 700/248 |
| 2017/0068243 A1 * | 3/2017 | MacCready | G05D 1/0206 |
| 2018/0333855 A1 * | 11/2018 | Moses | B25J 9/162 |
| 2019/0039826 A1 * | 2/2019 | Luckinbill | B25J 5/007 |
| 2019/0324479 A1 * | 10/2019 | Ghosh | G01C 21/12 |
| 2019/0342731 A1 * | 11/2019 | Krishnamoorthy | B25J 9/1676 |

OTHER PUBLICATIONS

International Search Report and Written Opinion dated Apr. 7, 2021 in PCT/IB2020/000871, 15 pages.

(Continued)

*Primary Examiner* — Kyle O Logan
(74) *Attorney, Agent, or Firm* — Oblon, McClelland, Maier & Neustadt, L.L.P.

(57) ABSTRACT

A method for transporting a payload in a storage facility is provided. A structural arrangement that is to be formed at a first location for lifting the payload is determined. The payload is associated with a plurality of fiducial markers. Based on the structural arrangement, a plurality of transport vehicles are selected for transporting the payload to a second location. A path that is to be traversed by the plurality of transport vehicles for transporting the payload is determined. A plurality of instructions are communicated to the plurality of transport vehicles to reach at a respective fiducial marker of the plurality of fiducial markers. Based on the plurality of instructions, the plurality of transport vehicles reach at the respective fiducial markers and form the determined structural arrangement. For transporting the payload, the plurality of transport vehicles move in sync along the determined path, while maintaining the determined structural arrangement.

20 Claims, 16 Drawing Sheets

(56) References Cited

OTHER PUBLICATIONS

Wilson, S., et al., "Design of ant-inspired stochastic control policies for collective transport by robotic swarms", Swarm Intelligence, Dec. 2014, vol. 8, No. 4, XP55765077, pp. 303-327.

Kun, W., et al., "Swarm Lifting Robot", Jan. 1, 2019, Retrieved from the Internet: URL: https://www.red-dot.org/project/swarm-lifting-robot-26305 [retrieved on Jan. 14, 2021], XP 055765231, 2 pages.

* cited by examiner

METHOD AND SYSTEM FOR TRANSPORTING PAYLOADS IN STORAGE FACILITIES

TECHNICAL FIELD

The present disclosure relates generally to management of storage facilities, and, more particularly to a method and a system for transporting a payload in a storage facility.

BACKGROUND

Typically, in a storage facility, inventory items or storage units need to be transported from one location to another location for performing various operations such as item retrieval or item placement. Examples of the inventory items may include, but are not limited to, automobile parts, electronic goods, mechanical goods, groceries, apparel, or the like. Several such storage facilities (such as warehouses or retail stores) utilize transport vehicles (i.e., automatic guided vehicles) to transport the inventory items or the storage units between various locations in the storage facilities. For example, a transport vehicle in a storage facility may transport a payload (such as an inventory item or a storage unit) from a first location to a second location in the storage facility.

In certain scenarios, payloads that are to be transported are irregular payloads. For example, a storage unit or an inventory item that is to be transported may have an uneven shape, irregular dimensions, a non-uniform base, a weight greater than a specific threshold, and/or the like. Transportation of such irregular payloads using a single transport vehicle may be difficult. For example, the irregular payload may topple during transportation due to a non-uniform base causing damage to the transport vehicle and other payloads (such as items or storage units) that are being transported, which leads to a significant loss in revenue. Further, a throughput and/or an efficiency of operations at the storage facility may be adversely affected due to toppling of the payload.

A known solution for handling irregular payloads involves customized transport vehicles that are capable of transporting irregular payloads. However, a customized transport vehicle may not be capable of transporting all types of irregular payloads. For example, the customized transport vehicle may not be capable of transporting an irregular payload having a shape different from the customized transport vehicle. Hence, the use of customized transport vehicles for transporting payloads may not be a scalable and flexible solution as sizes and dimensions of the payloads are not fixed. Another known solution for handling an irregular payload involves the usage of a transport vehicle having larger dimensions as compared to the irregular payload, such that the transport vehicle is sufficient to accommodate the entire payload. However, a larger transport vehicle may not be available at all time instants for transporting the irregular payload, resulting in decreased throughputs for operations at the storage facility, and a loss of revenue.

In light of the foregoing, there exists a need for a technical solution that facilitates transportation of irregular payloads in a storage facility without causing an adverse effect on the throughputs for operations at the storage facility.

SUMMARY

In an embodiment of the disclosure, a method for transporting a payload in a storage facility is provided. The method includes determining, by a server based on a first set of parameters associated with the payload, a structural arrangement to be formed at a first location in the storage facility for lifting the payload. The payload is stationed at the first location and is associated with a first plurality of fiducial markers. Based on the determined structural arrangement, a plurality of transport vehicles in the storage facility are selected by the server for lifting the payload and transporting the payload from the first location to a second location in the storage facility. A path that is to be traversed by the plurality of transport vehicles, while maintaining the determined structural arrangement, for transporting the payload to the second location is determined by the server. A plurality of instructions are communicated by the server to the plurality of transport vehicles to reach at a respective fiducial marker of the first plurality of fiducial markers. Based on the plurality of instructions, the plurality of transport vehicles reach at the respective fiducial markers to form the determined structural arrangement for lifting the payload. The plurality of transport vehicles move in sync with respect to each other along the determined path, while maintaining the determined structural arrangement, for transporting the lifted payload.

In another embodiment of the disclosure, a system for transporting a payload in a storage facility is provided. The system includes a first plurality of transport vehicles in the storage facility and a server in communication with the first plurality of transport vehicles. The server determines, based on a first set of parameters associated with the payload, a structural arrangement to be formed at a first location in the storage facility for lifting the payload. The payload is stationed at the first location and is associated with a first plurality of fiducial markers. The server selects, based on the determined structural arrangement, a second plurality of transport vehicles from the first plurality of transport vehicles for lifting the payload and transporting the payload from the first location to a second location in the storage facility. The server determines a path to be traversed by the second plurality of transport vehicles, while maintaining the determined structural arrangement, for transporting the payload to the second location. The server communicates a plurality of instructions to the second plurality of transport vehicles to reach at a respective fiducial marker of the first plurality of fiducial markers. Based on the plurality of instructions, the second plurality of transport vehicles reach at the respective fiducial markers to form the determined structural arrangement for lifting the payload. For transporting the lifted payload, the second plurality of transport vehicles move in sync with respect to each other along the determined path while maintaining the determined structural arrangement.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1:
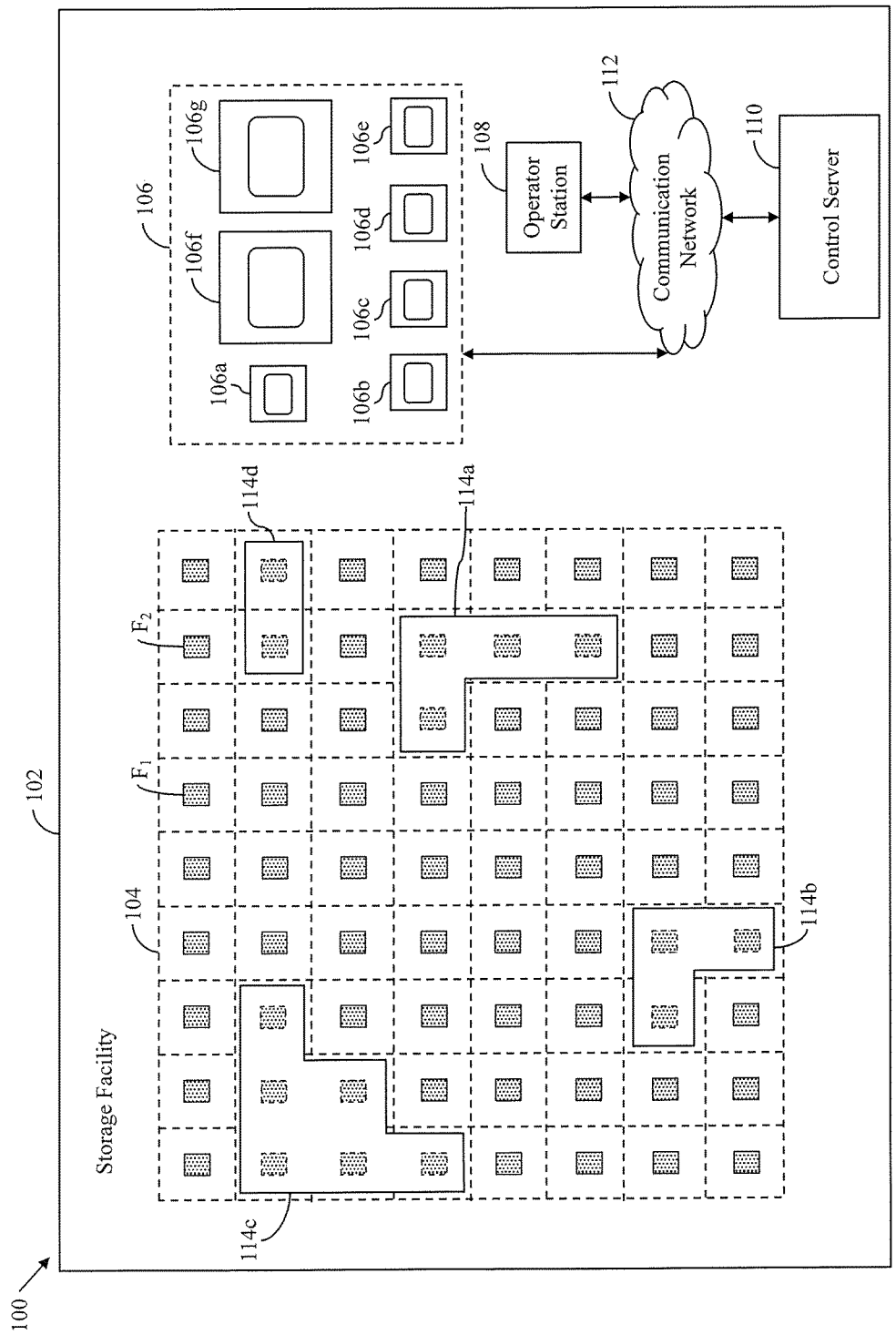
FIG. 1 is a block diagram that illustrates an exemplary environment, in accordance with an exemplary embodiment of the disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the disclosure provide a method and a system for transporting a payload from a first location to a second location in a storage facility. The system includes a first plurality of transport vehicles stationed at the storage facility and a server in communication with the first plurality of transport vehicles. Based on a first set of parameters associated with the payload, the server determines a structural arrangement to be formed at the first location for lifting the payload. The first set of parameters may include dimensions of the payload, a weight of the payload, a size of the payload, and/or a shape of the payload. The payload is stationed at the first location and associated with a first plurality of fiducial markers. Based on the determined structural arrangement and a second set of parameters associated with each of the first plurality of transport vehicles, the server selects a second plurality of transport vehicles from the first plurality of transport vehicles for lifting and transporting the payload from the first location to the second location. The second set of parameters may include a weight carrying capacity, a size, dimensions, a height, and/or a shape of each of the first plurality of transport vehicles. The server further determines a path to be traversed by the second plurality of transport vehicles, while maintaining the determined structural arrangement, for transporting the payload to the second location. In one embodiment, the determined path includes a plurality of sub-paths each associated with a transport vehicle of the second plurality of transport vehicles.

In some embodiments, the server communicates a plurality of instructions to the second plurality of transport vehicles to reach at respective fiducial markers of the first plurality of fiducial markers. Based on the plurality of instructions, the second plurality of transport vehicles reach at the respective fiducial markers to form the determined structural arrangement for lifting the payload. For transporting the lifted payload, the second plurality of transport vehicles move in sync with respect to each other along the determined path while maintaining the determined structural arrangement. The second plurality of transport vehicles are configured to traverse the determined path in a leader-follower configuration. The movement of the second plurality of transport vehicles is such that adjacent transport vehicles in the determined structural arrangement have a predetermined safe distance therebetween. In one embodiment, the predetermined safe distance is zero and the adjacent transport vehicles in the determined structural arrangement are in contact with each other. In some embodiments, the predetermined safe distance is greater than zero and the adjacent transport vehicles in the determined structural arrangement are not in contact with each other. In some embodiments, the safe distance between each pair of adjacent transport vehicles may be different or the same.

Based on the instructions of the server, the transport vehicles in the storage facility are capable of forming any structural arrangement required for transporting irregular payloads. Hence, the need for customized transport vehicles in the storage facility is overcome and throughputs for operations at the storage facility are improved.

In some embodiments, a "storage facility" may be a warehouse or a retail store that includes one or more storage units for storing inventory items. The storage facility may further include one or more paths for transport vehicles to move in the storage facility. Examples of the storage facility may include, but are not limited to, a forward warehouse, a backward warehouse, or a retail store.

In some embodiments, a "transport vehicle" is an automated guided vehicle (AGV) that transports payloads (e.g., inventory items, storage units, or packages) from one location to another location in a storage facility. For example, in a goods-to-person scenario, one or more transport vehicles may transport a storage unit from a first location to a second location for item retrieval or item placement.

In some embodiments, a "regular payload" refers to items, storage units, or packages that are capable of being carried by a single transport vehicle in a storage facility. The regular payload may be even in shape, dimensions, and/or weight. For example, a transport vehicle may transport a payload if a weight of the payload is less than or equal to a weight carrying capacity of the transport vehicle. In such a scenario, the payload is a regular payload. In another example, a transport vehicle may transport a payload if the transport vehicle is capable of accommodating a size, dimensions, or a shape of the payload. In such a scenario, the payload is a regular payload.

In some embodiments, an "irregular payload" may refer to irregular items, storage units, or packages that are not capable of being carried by a single transport vehicle and may require two or more transport vehicles for transportation. The irregular payload may be uneven in shape, size, dimensions, and/or weight. For example, two or more transport vehicles may be required to transport a payload if a weight of the payload is greater than a weight carrying capacity of a single transport vehicle. In such a scenario, the payload is an irregular payload. In another example, two or more transport vehicles may be required to transport a payload if a single transport vehicle is incapable of accommodating a size, dimensions, or a shape of the payload. In such a scenario, the payload is an irregular payload.

In some embodiments, a "structural arrangement" is a 3-dimensional spatial arrangement that may be required to be formed by two or more transport vehicles for transporting an irregular payload. For example, two or more transport vehicles may form an 'L-shaped' structural arrangement to transport an 'L-shaped' payload.

In some embodiments, an "optimal path" may be a route to be followed by a plurality of transport vehicles for transporting an irregular payload from one location to another location in the storage facility. For example, first through fourth transport vehicles may follow the optimal path for transporting an irregular payload from a first location to a second location. The optimal path may include a plurality of sub-paths each associated with a transport vehicle of the plurality of transport vehicles. For example, a first optimal path may include first through fourth sub-paths followed by first through fourth transport vehicles, respectively.

In some embodiments, a "safe distance" may be a minimum distance that is to be maintained between two transport vehicles, for avoiding a collision therebetween and maintaining a structural arrangement required for transporting an irregular payload. For example, for maintaining a structural arrangement to transport an irregular payload, a distance of 0 centimeters (cm) may be required to be maintained between first and second transport vehicles. In such a scenario, the safe distance is 0 cm. In another example, for maintaining a structural arrangement to transport an irregular payload, a distance of greater than 0 cm may be required and maintained between first and second transport vehicles.

In some embodiments, a "leader-follower configuration" may be a formation in which two or more transport vehicles traverse a path in the same direction while maintaining a structural arrangement. The transport vehicles, in a leader-follower configuration, may traverse the path, maintaining a safe distance therebetween. For example, first and second transport vehicles may traverse the path in a leader-follower configuration, such that the second transport vehicle follows the first transport vehicle along the path, constantly maintaining the safe distance therebetween. In such a scenario, the first transport vehicle serves as a leader and the second transport vehicle following the first transport vehicle serves as a follower.

FIG. 1 is a block diagram that illustrates an exemplary environment 100, in accordance with an exemplary embodiment of the disclosure. The environment 100 shows a portion of a storage facility 102. The storage facility 102 may include a storage area 104, a plurality of transport vehicles 106 (for example, first through seventh transport vehicles 106a-106g), an operator station 108, and a control server (CS) 110. Hereinafter, the plurality of transport vehicles 106 are referred to as the 'transport vehicles 106'. The CS 110 may communicate with the transport vehicles 106 and the operator station 108 by way of a communication network 112 or through separate communication networks established therebetween.

The storage facility 102 may store multiple inventory items or packages (i.e., pallets of aggregated inventory items) for fulfillment and/or selling. Examples of the storage facility 102 may include, but are not limited to, a forward warehouse, a backward warehouse, a fulfilment center, or a retail store (e.g., a supermarket, an apparel store, a grocery store, or the like). Examples of the inventory items may include, but are not limited to, electronic goods, mechanical goods, automobile parts, groceries, apparel, or the like. The inventory items or the packages may be stored in the storage area 104. The storage area 104 may be of any shape, for example, a rectangular shape. The storage area 104 may include various portable storage units (PSU) for storing the inventory items or packages. Each PSU may have a capacity to store multiple inventory items or packages. The inventory items, packages, and/or the PSUs may have different shapes, sizes, weights, and/or dimensions. Hereinafter, the terms 'inventory items' and "items" are used interchangeably.

In some embodiments, the storage facility 102 may be marked with various fiducial markers (such as fiducial markers $F_1$ and $F_2$). For the sake of illustration, the storage area 104 has been shown to include multiple fiducial markers and only the fiducial markers $F_1$ and $F_2$ have been labeled. It will be apparent to those of skill in the art that the entire storage facility 102 may include fiducial markers without deviating from the scope of the disclosure. The fiducial markers (for example, the fiducial markers $F_1$ and $F_2$) may correspond to location markers that are located at pre-determined locations in the storage facility 102. The pre-determined locations do not need to conform to any specific pattern, and may be subject to a configuration of the storage facility 102. For example, the fiducial markers $F_1$ and $F_2$ may be located at first and second positions (e.g., on the floor of the storage area 104). Examples of the fiducial markers may include, but are not limited to, barcodes, quick response (QR) codes, radio frequency identification device (RFID) tags, or the like. In one embodiment, the placement of the fiducial markers is uniform (i.e., a distance between consecutive fiducial markers is constant). In another embodiment, the placement of the fiducial markers may be non-uniform (i.e., a distance between consecutive fiducial markers is variable).

In some embodiments, the transport vehicles 106 are robotic vehicles that move in the storage facility 102. For example, the transport vehicles 106 may be AGVs that are responsive to instructions received from the CS 110. The transport vehicles 106 may include suitable logic, instructions, circuitry, interfaces, and/or code, executable by the circuitry, for transporting various payloads from one location to another location in the storage facility 102 based on the instructions received from the CS 110. Examples of the payloads may include the PSUs, the inventory items, and/or the packages stored in the storage facility 102. For example, the storage area 104 is shown to include first through fourth payloads 114a-114d. Hereinafter, the first through fourth payloads 114a-114d are collectively referred to as 'the payloads 114'. In one embodiment, the transport vehicles 106 may transport the payloads 114 from the storage area 104 to the operator station 108. In another embodiment, the transport vehicles 106 may transport the payloads 114 from the operator station 108 to the storage area 104. In another embodiment, the transport vehicles 106 may transport the payloads 114 from one location to another location within the storage area 104.

The transport vehicles 106 are configured to read the fiducial markers (e.g., the fiducial markers $F_1$ and $F_2$). The transport vehicles 106 may include various sensors (such as image sensors, RFID sensors, and/or the like) for reading and/or scanning the fiducial markers. Each transport vehicle 106 may utilize the fiducial markers for determining its relative position within the storage facility 102. In one embodiment, the transport vehicles 106 may have different shapes, sizes, dimensions, and weight carrying capacities. For example, the first through fifth transport vehicles 106a-106e may have a size of 1×1 units, whereas the sixth and seventh transport vehicles 106f and 106g may have a size of 10×10 units.

The operator station 108 in the storage facility 102 may be a pick-and-put station (PPS) where the inventory items or packages are either stored in the PSUs or retrieved from the PSUs. In one example, the transport vehicles 106 may transport the PSUs from the storage area 104 to the operator station 108 for item retrieval or item storage. Although the storage facility 102 is shown to include a single operator station 108, it will be apparent to those of skill in the art that the storage facility 102 may include any number of operator stations without deviating from the scope of the disclosure. The operator station 108 may include an instruction device that receives various commands or instructions from the CS 110 for placement and retrieval of the inventory items or the packages. Based on the received commands or instructions, one or more operators (e.g., human operators and robotic operators) at the operator station 108 perform operations for item retrieval or item storage.

The CS 110 is a network of computers, a software framework, or a combination thereof, that may provide a generalized approach to create the server implementation. Examples of the CS 110 include, but are not limited to, personal computers, laptops, mini-computers, mainframe computers, any non-transient and tangible machine that can execute a machine-readable code, cloud-based servers, distributed server networks, or a network of computer systems. The CS 110 may be realized through various web-based technologies such as, but not limited to, a Java web-framework, a .NET framework, a personal home page (PHP) framework, or any other web-application framework. The CS 110 may be maintained by a warehouse management authority or a third-party entity that facilitates inventory management operations for the storage facility 102. It will be understood by a person having ordinary skill in the art that the CS 110 may perform other warehouse management operations in addition to the inventory management operations. Embodiments of various components of the CS 110 and their functionalities are described later in conjunction with FIG. 10.

Figure 10:
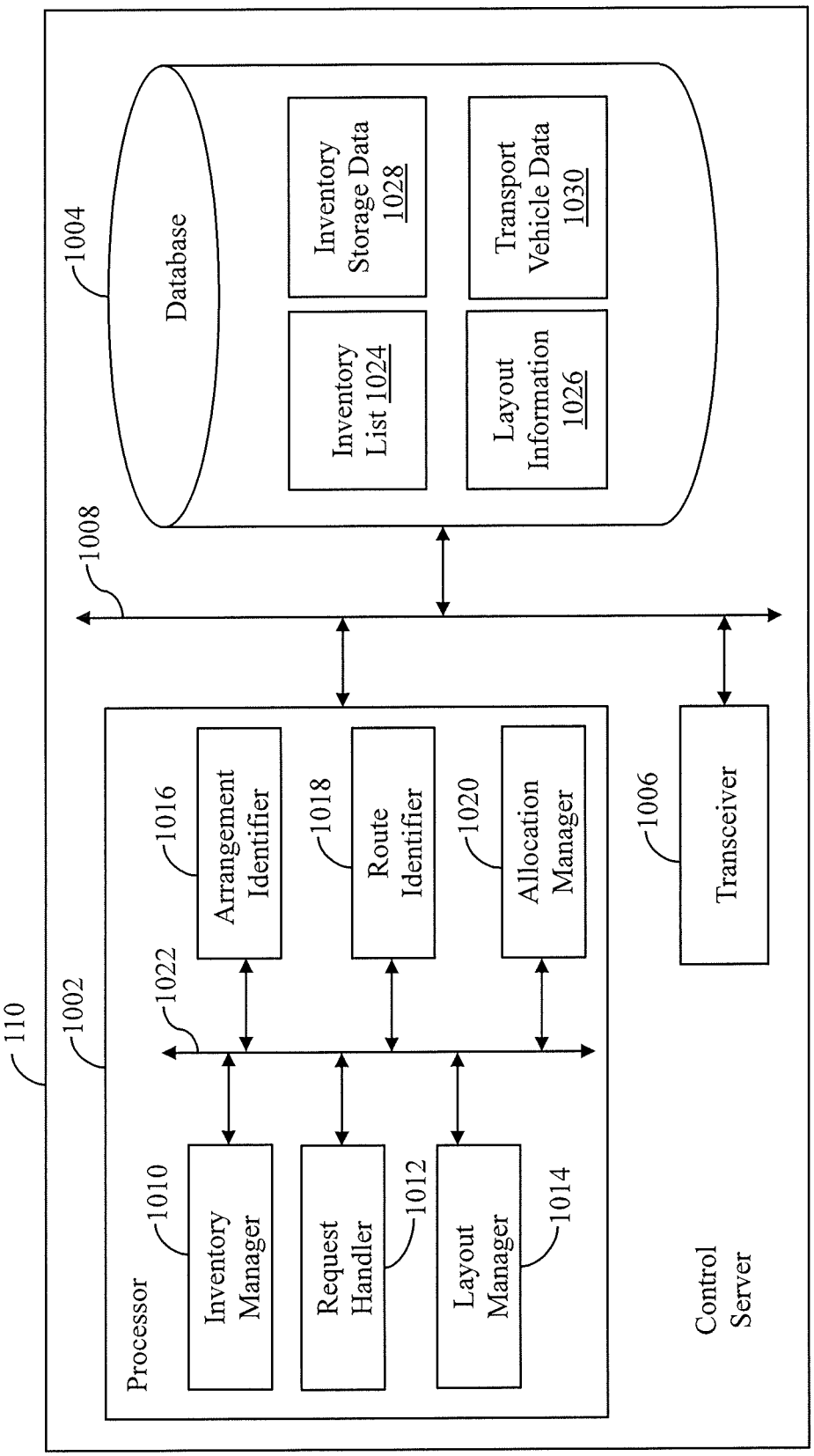
FIG. 10 is a block diagram that illustrates a control server (CS) of FIG. 1, in accordance with an exemplary embodiment of the disclosure.

The CS 110 may store, in a memory of the CS 110, a virtual map and inventory storage data (as shown in FIG. 10) of the storage facility 102. The virtual map may be indicative of locations of the PSUs, the operator stations 108, entry and exit points of the storage facility 102, the fiducial markers in the storage facility 102, or the like. The inventory storage data may be indicative of associations between the inventory items stored in the storage facility 102 and the fiducial markers in the storage facility 102. The CS 110 may receive a request from an external communication server for transporting a payload (for example, any of the first through fourth payloads 114a-114d) from a first location to a second location in the storage facility 102. The payload that is to be transported may be a PSU, an inventory item, or a package. The payload may be currently stationed at the first location, and associated with a first set of fiducial markers that correspond to a space occupied by the payload in the storage facility 102. The CS 110 may determine whether the payload is an irregular payload or a regular payload based on a first set of parameters associated with the payload. If a single transport vehicle 106 is sufficient to transport a payload, the payload is determined to be a regular payload; however, if multiple transport vehicles 106 are required to transport the payload, the payload is determined to be an irregular payload. The first set of parameters may include dimensions, a weight, a size, a weight distribution profile, a height, and/or a shape of the payload.

After determining that the payload is an irregular payload, the CS 110 may determine a structural arrangement to be formed at the first location for lifting the payload. The structural arrangement may correspond to a 3-dimensional spatial arrangement that conforms to the size, shape, and dimensions of the payload. Based on the determined structural arrangement, the CS 110 may select a first set of transport vehicles from the transport vehicles 106 for lifting the payload, and transporting the payload from the first location to the second location. The CS 110 may select the first set of transport vehicles further based on a second set of parameters associated with each transport vehicle 106. The second set of parameters may include a weight carrying capacity, dimensions, a shape, a size, and/or a height of each transport vehicle 106.

After selecting the first set of transport vehicles, the CS 110 determines a path to be traversed by the first set of transport vehicles for transporting the payload to the second location. The determined path includes a set of sub-paths each associated with a respective transport vehicle of the first set of transport vehicles. The determined path is associated with, in some examples, various fiducial markers that need be traversed by the first set of transport vehicles. For example, each sub-path is defined by a set of sequences of the fiducial markers that is to be traversed by the corresponding transport vehicle.

After determining the path, the CS 110 may communicate a first set of instructions to the first set of transport vehicles to reach at a respective fiducial marker of the first set of fiducial markers associated with the payload. An instruction communicated by the CS 110 to a selected transport vehicle (e.g., the first transport vehicle 106a) may include navigation information for the first transport vehicle 106a to reach, from a current location of the first transport vehicle 106a, at the respective fiducial marker in the first location and, then, at a respective fiducial marker associated with the second location. For example, the navigation information may define an optimal path to reach the second location from the first location after the payload is lifted by the first set of transport vehicles. The first set of instructions communicated by the CS 110 to the first set of transport vehicles may further include an identifier of the payload that is to be transported by the first set of transport vehicles. The first set of transport vehicles lifts the payload and traverses the respective sub-paths, while maintaining the determined structural arrangement, for transporting the payload to the second location.

The CS 110 may further execute one or more operations to avoid collisions among the first set of transport vehicles, while the first set of transport vehicles traverses the respective sub-paths by forming the determined structural arrangement. For avoiding collision among the first set of transport vehicles, the CS 110 determines a safe distance that needs to be maintained between any two adjacent transport vehicles in the determined structural arrangement. The CS 110 may communicate information pertaining to the safe distance to the first set of transport vehicles. Based on the safe distance information, the first set of transport vehicles traverses the respective sub-paths in a leader-follower formation (i.e., a leader-follower configuration) such that a relative position of each transport vehicle is fixed with respect to the other transport vehicles in the determined structural arrangement. For example, a relative position of the first transport vehicle 106a is fixed with respect to the second and third transport vehicles 106b and 106c, when the first through third transport vehicles 106a-106c traverse the determined path for transporting the payload. In one embodiment, the safe distance is zero and adjacent transport vehicles in the determined structural arrangement are in contact with each other.

The CS 110 may further identify a minimum bounding box that encompasses the determined structural arrangement of the first set of transport vehicles. The minimum bounding box may be associated with a second set of fiducial markers. At any time-instance after the payload is lifted by the first set of transport vehicles, the first set of transport vehicles occupies a third set of fiducial markers from the second set of fiducial markers. After identifying the minimum bounding box, the CS 110 reserves one or more remaining fiducial markers in the second set of fiducial markers that remain unoccupied. The CS 110 may reserve the one or more unoccupied fiducial markers to avoid collision of the first set of transport vehicles with other transport vehicles that are moving in the storage facility 102. The CS 110 may continuously determine the minimum bounding box as the first set of transport vehicle traverses the determined path and reserve the unoccupied fiducial markers associated with the minimum bounding box.

The CS 110 may further receive scan information pertaining to scanned fiducial markers from the transport vehicles 106, while the transport vehicles 106 travel in the storage facility 102. For example, when the first transport vehicle 106a is moving along the first sub-path, the first transport vehicle 106a notifies the CS 110 every time the first transport vehicle 106a traverses and scans a fiducial marker included in the first sub-path. The CS 110 further identifies a dropped payload or a damaged fiducial marker in the storage facility 102 based on the scan information received from the transport vehicles 106. For example, based on the scan information received by the CS 110, the CS 110 may determine that a transport vehicle (e.g., any of the transport vehicles 106) has failed to scan a fiducial marker present at a position traversed by the transport vehicle. In one embodiment, the CS 110 may determine that the failure in scanning the fiducial marker may be due to a dropped payload that is covering the unscanned fiducial marker. In another embodiment, the CS 110 may determine that the unscanned fiducial marker may have been damaged or faded over time.

The CS 110 may further determine whether the payload is transported to the second location by the first set of transport vehicles. Based on the determination that the payload is transported to the second location, the CS 110 communicates a second set of instructions to the first set of transport vehicles to disperse and break out the determined structural arrangement, and wait for the next task to be assigned. Embodiments of the operations performed by the CS 110 for facilitating the transportation of the payload in the storage facility 102 are explained in detail in FIGS. 5A-5D.

The communication network 112 is a medium through which content and instructions may be transmitted between the CS 110, the transport vehicles 106, and the operator station 108. Examples of the communication network 112 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2A:
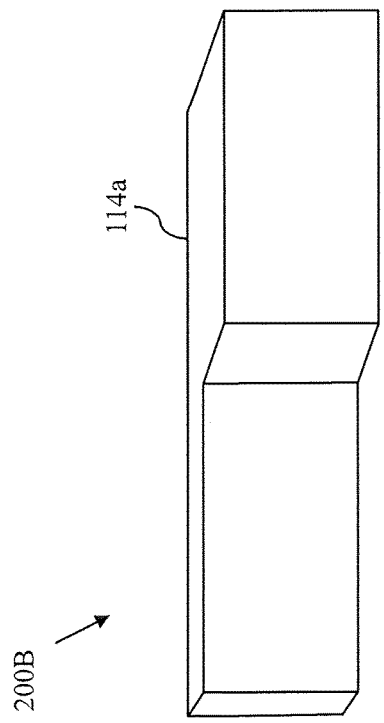
FIG. 2A is a block diagram that illustrates a top view of a first payload of FIG. 1, in accordance with an exemplary embodiment of the disclosure.

FIG. 2A is a block diagram that illustrates a top view 200A of the first payload 114a, in accordance with an exemplary embodiment of the disclosure. As shown in FIG. 2A, the first payload 114a has an uneven shape, thus, a single transport vehicle 106 may not be sufficient to transport the first payload 114a. In such a scenario, the CS 110 may determine that the first payload 114a is an irregular payload. The first payload 114a may be an inventory item, a PSU, or a package. In one exemplary scenario, the first payload 114a is assumed to be an 'L-shaped' inventory item.

Figure 2B:
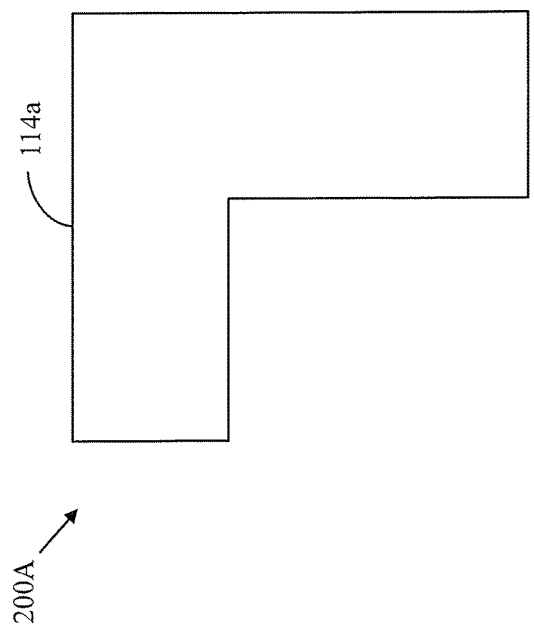
FIG. 2B is a block diagram that illustrates a perspective view of the first payload, in accordance with an exemplary embodiment of the disclosure.

FIG. 2B is a block diagram that illustrates a perspective view 200B of the first payload 114a, in accordance with an exemplary embodiment of the disclosure. It will be apparent to those of skill in the art that other payloads 114b-114d in the storage area 104 may be structurally different from the first payload 114a. The payloads 114 may be structurally different due to differences in dimensions, heights, base types, weights, sizes, and/or shapes of the payloads 114.

Figure 3A:
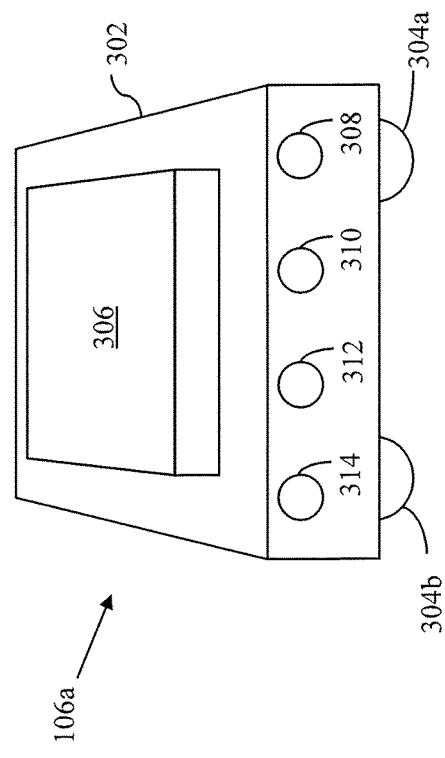
FIG. 3A is a block diagram that illustrates a first transport vehicle of FIG. 1, in accordance with an exemplary embodiment of the disclosure.

FIG. 3A is a block diagram that illustrates the first transport vehicle 106a, in accordance with an exemplary embodiment of the disclosure. The first transport vehicle 106a includes a first body 302, a first moving mechanism 304 (such as first and second wheels 304a and 304b), and a first contact plate 306. The first body 302 may include a first controller to control functions of the first transport vehicle 106a. The first controller may receive commands and instructions from the CS 110 by way of a first transceiver included in the first body 302. The first controller may include a navigation unit (e.g., a global positioning system, GPS) that receives the navigation information from the CS 110. The navigation information may include details of paths (e.g., the first sub-path) that are to be traversed by the first transport vehicle 106a. The first body 302 may further include a first obstacle detection system (ODS) 308, a first fiducial marker reading system (FMRS) 310, a first weight measurement system (WMS) 312, a first watchdog module 314, or the like. The first body 302 may further include a motor to control the first moving mechanism 304. The motor is subject to control by the first controller based on the navigation information.

The first ODS 308 may include suitable logic, instructions, circuitry, interfaces, and/or code, executable by the circuitry, for detecting obstacles in a path traversed by the first transport vehicle 106a. If the first ODS 308 detects an obstacle, the first controller may decelerate the first transport vehicle 106a to bring the first transport vehicle 106a to a halt, thereby avoiding a collision of the first transport vehicle 106a with the obstacle. In a scenario where the first transport vehicle 106a is a part of a structural arrangement determined by the CS 110, other transport vehicles in the structural arrangement are also halted when the first transport vehicle 106a is halted.

The first FMRS 310 may include suitable logic, instructions, circuitry, interfaces, and/or code, executable by the circuitry, for scanning and reading the fiducial markers and, consequently, navigating the path allocated to the first transport vehicle 106a. The first FMRS 310 may communicate details of a fiducial marker to the first controller when the first transport vehicle 106a reaches the fiducial marker. Consequently, the first controller may communicate the details of the fiducial marker (i.e., the scan information) to the CS 110 by way of the first transceiver included in the first body 302. The CS 110 may track the movement of the first transport vehicle 106a by way of the details of the fiducial markers communicated by the first controller to the CS 110.

The first WMS 312 includes suitable logic, instructions, circuitry, interfaces, and/or code, executable by the circuitry, for measuring a weight of a payload (e.g., an inventory item, a package, or a PSU) carried by the first transport vehicle 106a. Based on the weight of the payload, the first controller controls a lifting mechanism that is used to raise the first contact plate 306 for raising the payload, The first contact plate 306 may be raised or lowered based on the weight of the payload to lower a center of gravity (COG) of the first transport vehicle 106a. A low COG may be necessary to ensure that the payload is stable during transportation. The height by which a payload is raised above a floor level of the floor is dependent upon the weight of the payload, an evenness of the floor, or the like.

The first watchdog module 314 includes suitable logic, instructions, circuitry, interfaces, and/or code, executable by the circuitry, for bringing the first transport vehicle 106a to a halt. The first watchdog module 314 may include a first timer that may be set to a timer value such that the first transport vehicle 106a is halted when the first timer times out.

It will be apparent to those of skill in the art that the second through seventh transport vehicles 106b-106g are functionally similar to the first transport vehicle 106a. The second through seventh transport vehicles 106b-106g may be structurally different from the first transport vehicle 106a. For example, a size, a shape, or dimensions of the second transport vehicle 106b may be different from the size, shape, or dimensions of the first transport vehicle 106a.

Figure 3B:
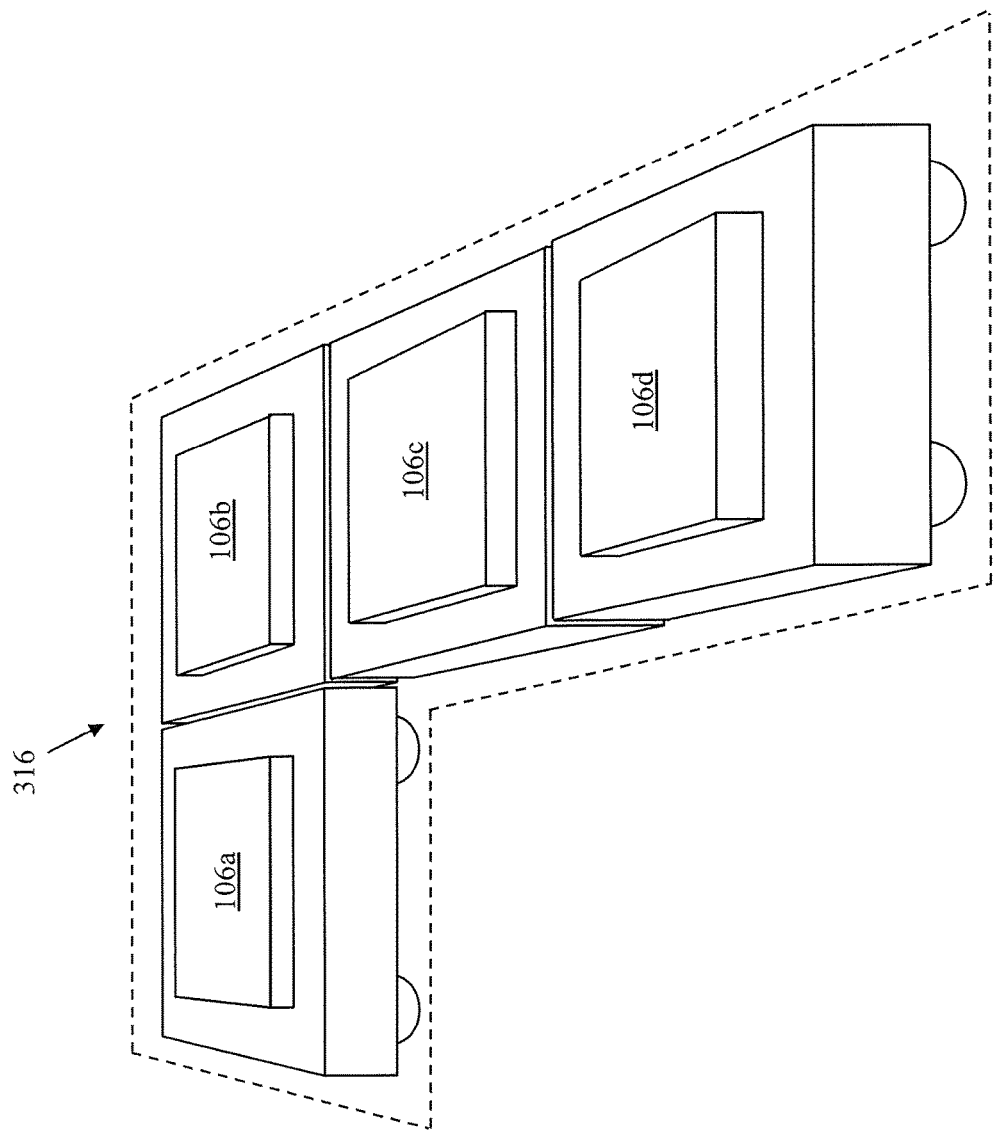
FIG. 3B is a block diagram that illustrates a first structural arrangement formed by a first set of transport vehicles, in accordance with an exemplary embodiment of the disclosure.

FIG. 3B is a block diagram that illustrates a first structural arrangement 316 formed by the first set of transport vehicles, in accordance with an exemplary embodiment of the disclosure. The CS 110 may receive a first request from the external communication server for transporting the first payload 114a from the first location to the second location. The first payload 114a may be stationed at the first location and is associated with the first set of fiducial markers. The CS 110 may determine that the first payload 114a is an irregular payload. Thus, the CS 110 may determine that the first structural arrangement 316 is to be formed at the first location for transporting the first payload 114a. The CS 110 may then select the first through fourth transport vehicles 106a-106d that are capable of forming the first structural arrangement 316 for transporting the first payload 114a from the first location to the second location. The CS 110 may communicate the first set of instructions to the first through fourth transport vehicles 106a-106d. Based on the first set of instructions, the first through fourth transport vehicles 106a-106d may reach at respective fiducial markers at the first location to form the first structural arrangement 316. In the first structural arrangement 316, the first and second transport vehicles 106a and 106b may be adjacent, the second and third transport vehicles 106b and 106c may be adjacent, and the third and fourth transport vehicles 106c and 106d may be adjacent. Thus, the first through fourth transport vehicles 106a-106d may form the L-shaped structural arrangement 316.

Figures 4A, 4B:
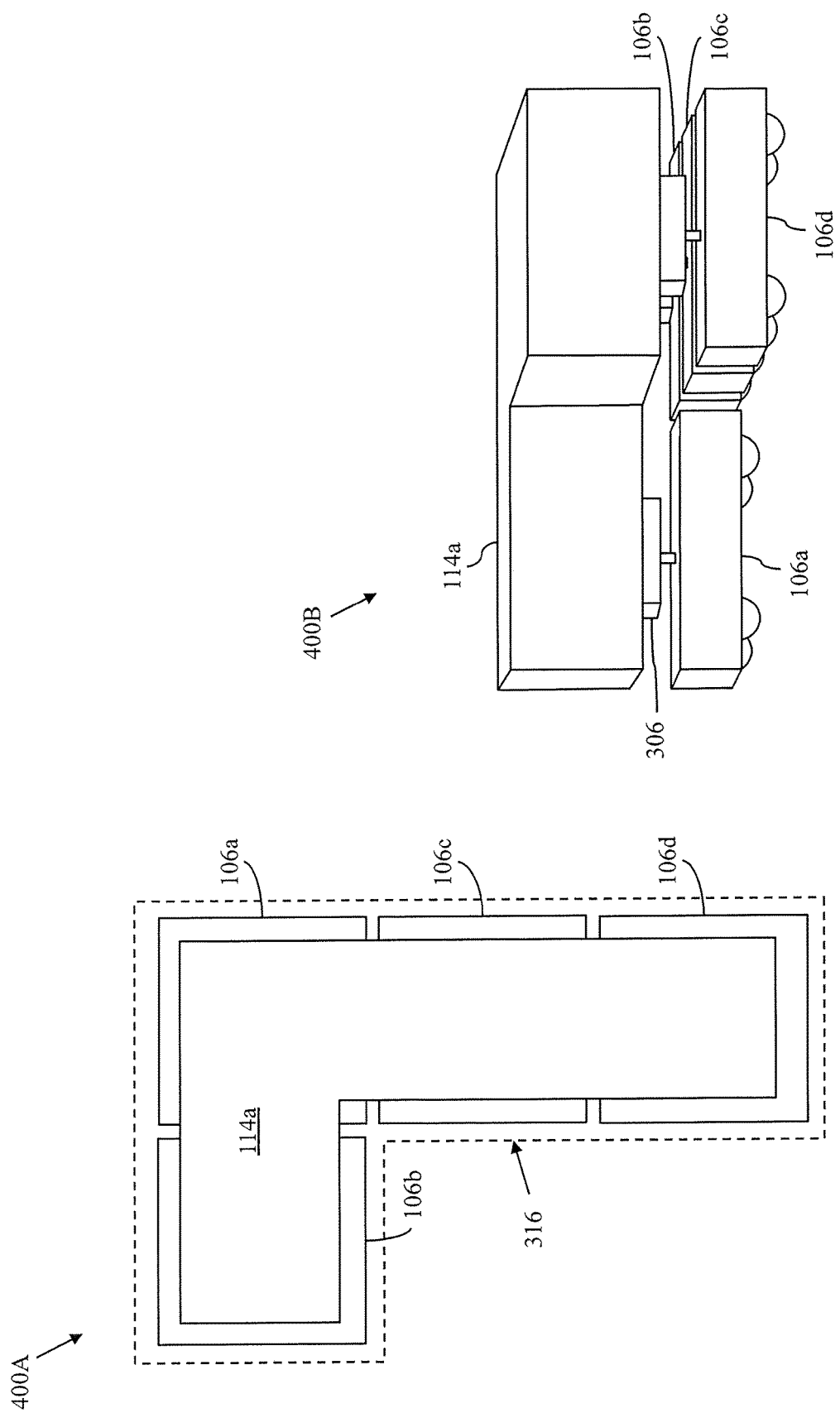
FIG. 4A is a block diagram that illustrates a top view of the first structural arrangement formed by the first set of transport vehicles for transporting the first payload, in accordance with an exemplary embodiment of the disclosure.
FIG. 4B is a block diagram that illustrates a perspective view of the first structural arrangement formed by the first set of transport vehicles for transporting the first payload, in accordance with an exemplary embodiment of the disclosure.

FIG. 4A is a block diagram that illustrates a top view 400A of the first structural arrangement 316 formed by the first set of transport vehicles for transporting the first payload 114a, in accordance with an exemplary embodiment of the disclosure. The first through fourth transport vehicles 106a-106d (i.e., the first set of transport vehicles) may reach at the respective fiducial markers at the first location to form the first structural arrangement 316, and may lift the first payload 114a based on the first set of instructions received from the CS 110.

FIG. 4B is a block diagram that illustrates a perspective view 400B of the first structural arrangement 316 formed by the first set of transport vehicles for transporting the first payload 114a, in accordance with an exemplary embodiment of the disclosure. As shown in FIG. 4B, contact plates (for example, the first contact plate 306) of each of the first through fourth transport vehicles 106a-106d may be raised to lift the first payload 114a.

FIGS. 5A-5D, collectively represent an exemplary scenario 500 that describes a method for transporting an irregular payload in the storage facility 102, in accordance with an exemplary embodiment of the disclosure. FIGS. 5A-5D are described in conjunction with FIGS. 1-4B. A portion of the storage facility 102, including the first payload 114a, the first through fifth transport vehicles 106a-106e, and fiducial markers $F_1$-$F_{41}$, is shown in FIGS. 5A-5D.

Figure 5A:
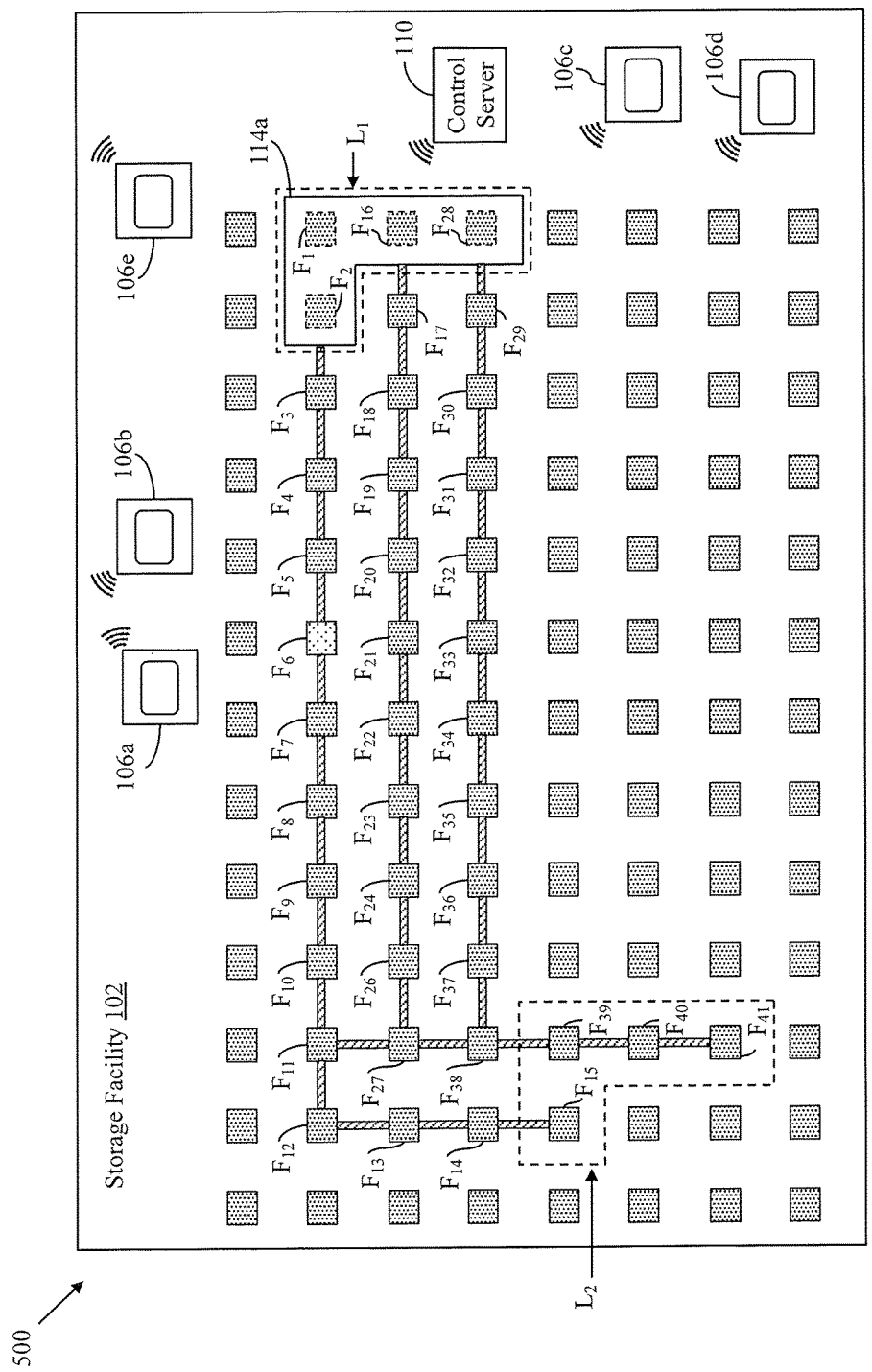
FIGS. 5A-5D, collectively represent an exemplary scenario that describes a method for transporting an irregular payload in a storage facility of FIG. 1, in accordance with an exemplary embodiment of the disclosure.

With reference to FIG. 5A, the CS 110 may receive the first request from the external communication server for transporting the first payload 114a from the first location $L_1$ to the second location $L_2$ in the storage facility 102. In one embodiment, the first request may be an item retrieval request. In another embodiment, the first request may be an item placement request. The first request may include information pertaining to the first payload 114a that is to be transported from the first location $L_1$ to the second location $L_2$. Based on the first request, the CS 110 retrieves the virtual map of the storage facility 102 and the inventory storage data of the storage facility 102. In some embodiments, the virtual map and inventory storage data may be stored on memory of the CS 110. In other embodiments, the virtual map and inventory storage data may be stored in a cloud based storage system, a remote server, or other computer readable memory that is remote from the CS 110. The CS 110 then identifies the location of the first payload 114a by referring to the virtual map. In an exemplary scenario, the CS 110 identifies that the first payload 114a is currently stationed at the first location $L_1$ and is associated with the first set of fiducial markers $F_1$, $F_2$, $F_{16}$, and $F_{28}$. For example, the first payload 114a may occupy a space that is associated with the first set of fiducial markers $F_1$, $F_2$, $F_6$, and $F_{28}$.

The CS 110 may further identify the first set of parameters associated with the first payload 114a by referring to the inventory storage data. The first set of parameters may include the weight, size, weight distribution profile, height, the dimensions, and/or shape of the first payload 114a. Based on the first set of parameters of the first payload 114a, the CS 110 determines whether the first payload 114a is an irregular payload or a regular payload. As shown in FIG. 5A, the first payload 114a is an 'L-shaped' payload. The CS 110 may determine that a single transport vehicle may not be sufficient to transport the first payload 114a, thus, the first payload 114a is determined to be an irregular payload. In one embodiment, the CS 110 may determine that a single transport vehicle 106 may not be sufficient to transport the first payload 114a due to an irregular shape of the first payload 114a. In one embodiment, the CS 110 may determine that a single transport vehicle 106 may not be sufficient to transport the first payload 114a due to the weight of the first payload 114a being greater than the weight carrying capacity of each of the transport vehicles 106.

The CS 110 may then determine the first structural arrangement 316 (as shown in FIG. 4A) to be formed for transporting the first payload 114a based on the first set of parameters of the first payload 114a. For example, as the first payload is an 'L-shaped' payload, the first structural arrangement 316 determined by the CS 110 may also be 'L-shaped'. The CS 110 may select the first through fourth transport vehicles 106a-106d from the transport vehicles 106 in the storage facility 102 to form the first structural arrangement 316 for lifting and transporting the first payload 114a. The CS 110 may select the first through fourth transport vehicles 106a-106d based on various factors such as the first structural arrangement 316 that is to be formed, a proximity of the transport vehicles 106 to the first payload 114a, a required throughput for fulfilling the first request, the second set of parameters of each of the transport vehicles 106, the size of each of the transport vehicles, or the like. It will be apparent to a person of skill in the art that the CS 110 may select the first through fourth transport vehicles 106a-106d such that the throughput for fulfilling the first request is maximized.

After selecting the first through fourth transport vehicles 106a-106d, the CS 110 determines an optimal path for transporting the first payload 114a from the first location $L_1$ to the second location $L_2$. The CS 110 determines the optimal path based on various factors such as a travel cost associated with a path, a required throughput, availability of paths in the storage facility 102, or the like. The travel cost associated with a path may be a function of an estimated time taken to traverse the path, a number of fiducial markers to be traversed in the path, and/or the like. The optimal path determined by the CS 110 may include first through fourth sub-paths that the first through fourth transport vehicles 106a-106d need to traverse to reach the second location $L_2$, respectively. For example, the first sub-path includes sequential traversal of the fiducial markers $F_2$, $F_3$, $F_4$, $F_5$, $F_6$, $F_7$, $F_8$, $F_9$, $F_{10}$, $F_{11}$, $F_{12}$, $F_{13}$, $F_{14}$, and $F_{15}$ (i.e., $F_2 \rightarrow F_3 \rightarrow F_4 \rightarrow F_5 \rightarrow F_6 \rightarrow F_7 \rightarrow F_8 \rightarrow F_9 \rightarrow F_{10} \rightarrow F_{11} \rightarrow F_{12} \rightarrow F_{13} \rightarrow F_{14} \rightarrow F_{15}$). Similarly, the second sub-path may include sequential traversal of the fiducial markers $F_1$, $F_2$, $F_3$, $F_4$, $F_5$, $F_6$, $F_7$, $F_8$, $F_9$, $F_{10}$, $F_{11}$, $F_{27}$, $F_{38}$, and $F_{39}$ (i.e., $F_1 \rightarrow F_2 \rightarrow F_3 \rightarrow F_4 \rightarrow F_5 \rightarrow F_6 \rightarrow F_7 \rightarrow F_8 \rightarrow F_9 \rightarrow F_{10} \rightarrow F_{11} \rightarrow F_{27} \rightarrow F_{38} \rightarrow F_{39}$). The third sub-path include sequential traversal of the fiducial markers $F_{16}$, $F_{17}$, $F_{18}$, $F_{19}$, $F_{20}$, $F_{21}$, $F_{22}$, $F_{23}$, $F_{24}$, $F_{25}$, $F_{26}$, $F_{27}$, $F_{38}$, $F_{39}$, and $F_{40}$ (i.e., $F_{16} \rightarrow F_{17} \rightarrow F_{18} \rightarrow F_{19} \rightarrow F_{20} \rightarrow F_{21} \rightarrow F_{22} \rightarrow F_{23} \rightarrow F_{24} \rightarrow F_{25} \rightarrow F_{26} \rightarrow F_{27} \rightarrow F_{38} \rightarrow F_{39} \rightarrow F_{40}$). The fourth sub-path may include sequential traversal of the fiducial markers $F_{28}$, $F_{29}$, $F_{30}$, $F_{31}$, $F_{32}$, $F_{33}$, $F_{34}$, $F_{35}$, $F_{36}$, $F_{37}$, $F_{38}$, $F_{39}$, $F_{40}$, and $F_{41}$ (i.e., $F_{28} \rightarrow F_{29} \rightarrow F_{30} \rightarrow F_{31} \rightarrow F_{32} \rightarrow F_{33} \rightarrow F_{34} \rightarrow F_{35} \rightarrow F_{36} \rightarrow F_{37} \rightarrow F_{38} \rightarrow F_{39} \rightarrow F_{40} \rightarrow F_{41}$).

Figure 5B:
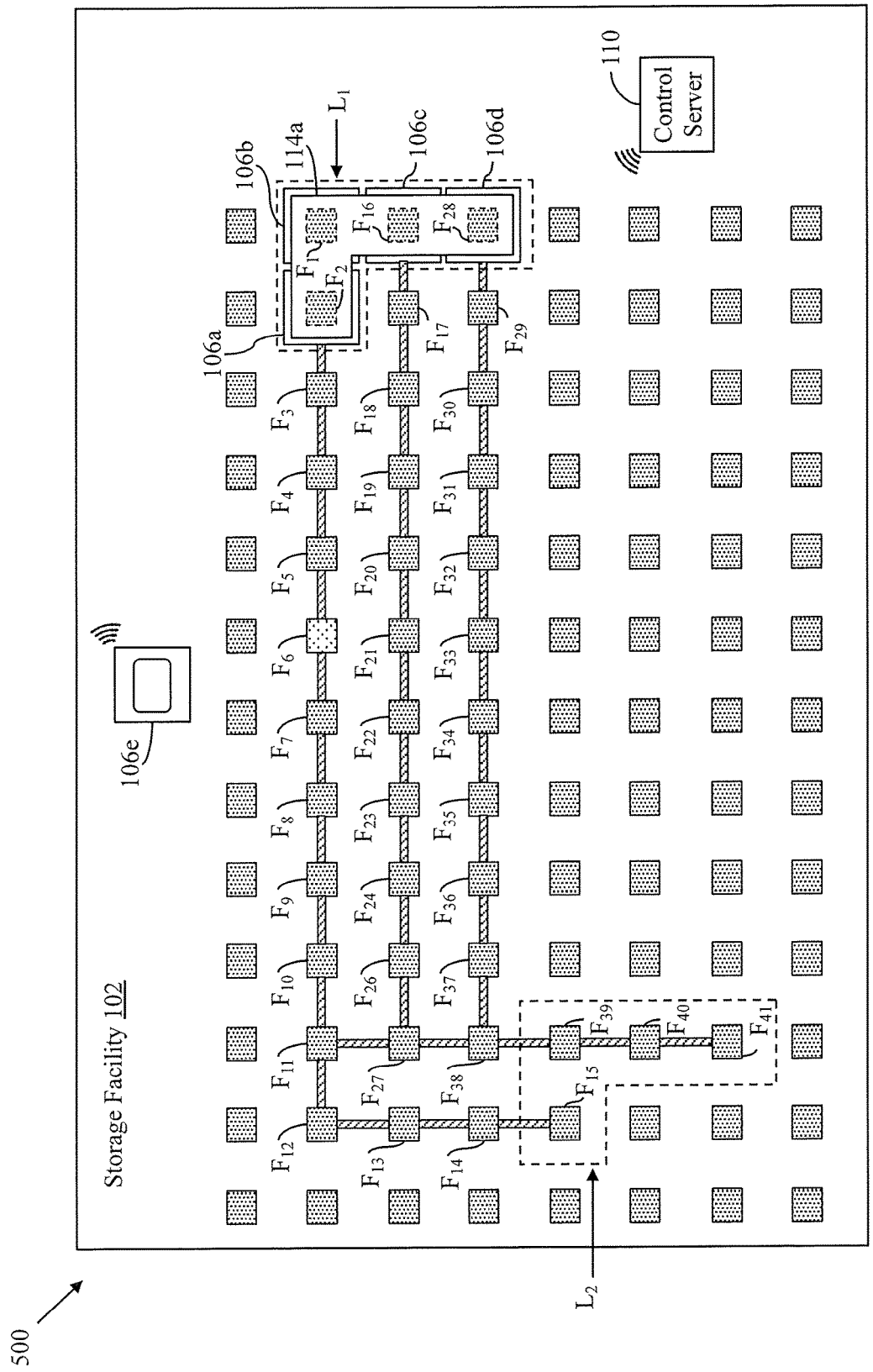
Figure 5C:
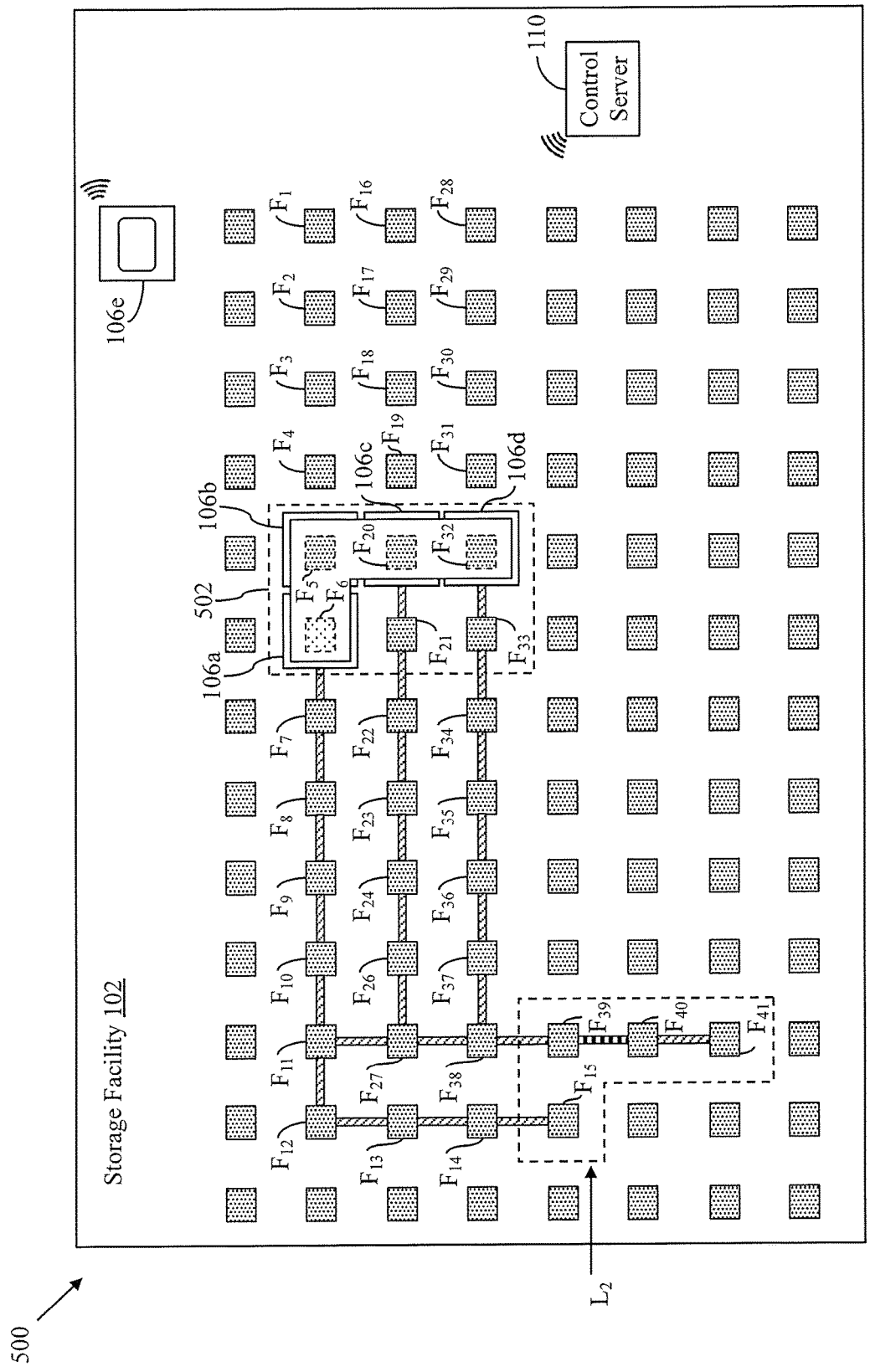

With reference to FIG. 5B, after determining the optimal path, the CS 110 may communicate the first set of instructions to the first set of transport vehicles (i.e., the first through fourth transport vehicles 106a-106d) to reach at respective fiducial markers of the first set of fiducial markers $F_1$, $F_2$, $F_{16}$, and $F_{28}$. For example, the first, second, third, and fourth transport vehicles 106a, 106b, 106c, and 106d may be instructed to reach at the fiducial markers $F_2$, $F_1$, $F_{16}$, and $F_{28}$, respectively. Each instruction of the first set of instructions may include information pertaining to the fiducial markers that need to be traversed by the respective transport vehicle. Based on the first set of instructions, the first through fourth transport vehicles 106a-106d move from their current locations and reach at the respective fiducial markers in the first location $L_1$ to form the first structural arrangement 316 for lifting the first payload 114a. For example, as shown in FIG. 5B, the first through fourth transport vehicles 106a-106d have reached the fiducial markers $F_2$, $F_1$, $F_{16}$, and $F_{28}$, respectively. After reaching the respective fiducial markers, the first through fourth transport vehicles 106a-106d move in sync along the respective sub-paths to transport the first payload 114a to the second location $L_2$ (as shown in FIG. 5C).

In some embodiments, for maintaining the first structural arrangement 316 of the first through fourth transport vehicles 106a-106d when the first through fourth transport vehicles 106a-106d traverse the respective sub-paths, the CS 110 may implement a synchronize-movement method. For example, the CS 110 may receive real-time location information from the first through fourth transport vehicles 106a-106d. Based on the received real-time location information, the CS 110 determines that at a first time instant, the first through fourth transport vehicles 106a have reached at the fiducial markers $F_2$, $F_1$, $F_{16}$, and $F_{28}$, respectively, and have formed the first structural arrangement 316. The CS 110 may then communicate 'sync-move' (SM) instructions to the first through fourth transport vehicles 106a-106d, for implementing the synchronize-movement method. The SM instructions indicate a designation of the first through fourth transport vehicles 106a-106d as a leader or a follower. In one embodiment, the first transport vehicle 106a is designated as a leader and the second through fourth transport vehicles 106b-106d are designated as followers based on the SM instructions.

The SM instructions may further include information pertaining to a safe distance determined by the CS 110. The CS 110 may determine the safe distance based on a set of factors such as dimensions of the first through fourth transport vehicles 106a-106d, the dimensions of the first payload 114a, or the like. In one example, the CS 110 may determine the safe distance such that when the safe distance is maintained between the adjacent transport vehicles in the first structural arrangement 316, the adjacent transport vehicles are in contact but do not exert enough force on each other to cause the first payload 114a to be dislodged. In another example, the CS 110 may determine the safe distance such that when the safe distance is maintained between the adjacent transport vehicles in the first structural arrangement 316, the adjacent transport vehicles are not in contact. The set of factors may further include the weight of the first payload 114a and first through fourth velocity profiles (such as peak velocity, acceleration rate, deceleration rate, or the like) of the first through fourth transport vehicles 106a-106d, respectively. For example, the CS 110 may consider the deceleration rate of the second transport vehicle 106b while determining the safe distance. As the safe distance is determined based on the deceleration rate of the second transport vehicle 106b, the first payload 114a is prevented from toppling when the second transport vehicle 106b has to deaccelerate while traversing the optimal path. It will be apparent to those of skill in the art that the safe distance may take any value that indicates a length (e.g., feet, meters, etc.). In another example, the CS 110 may determine different safe distances for different pairs of adjacent transport vehicles in the first structural arrangement 316. For the sake on ongoing description of FIG. 5, it is assumed that the safe distance determined by the CS 110 is equal to 0 cm and the adjacent transport vehicles in the first structural arrangement 316 are in contact with each other.

The first through fourth transport vehicles 106a-106d receive the SM instructions from the CS 110. Based on the SM instructions, the first through fourth transport vehicles 106a-106d begin to move synchronously (i.e., a movement of the first through fourth transport vehicles 106a-106d is synchronized) along the determined optimal path by forming the first structural arrangement 316. The first transport vehicle 106a begins moving, from the fiducial marker $F_2$, towards the fiducial marker $F_3$. Simultaneously, the second transport vehicle 106b begins moving, from the fiducial marker $F_1$, towards the fiducial marker $F_2$. The third transport vehicle 106c begins moving, from the fiducial marker $F_{16}$, towards the fiducial marker $F_{17}$. The fourth transport vehicle 106d begins moving, from the fiducial marker $F_{28}$, towards the fiducial marker $F_{29}$. The adjacent transport vehicles (for example, the first and second transport vehicles 106a and 106b) maintain a separation equal to the safe distance therebetween. In one example, if the first transport vehicle 106a comes to a halt due to an obstacle in the first sub-path, the second through fourth transport vehicles 106b-106d also halt simultaneously. Further, a relative position of each of the first through fourth transport vehicle 106a-106d may be fixed with respect to the other transport vehicles in the first structural arrangement 316. For example, a relative position of the first transport vehicle 106a is fixed with respect to the second through fourth transport vehicles 106b-106d, when the first through fourth transport vehicles 106a-106d traverse the optimal path for transporting the first payload 114a.

With reference to FIG. 5C, while the first through fourth transport vehicles 106a-106d are traversing the determined optimal path by forming the first structural arrangement 316, the CS 110 identifies the minimum bounding box 502 that encompasses the first structural arrangement 316 of the first through fourth transport vehicles 106a-106d. The minimum bounding box 502 is associated with the second set of fiducial markers, i.e., the fiducial markers $F_5$, $F_6$, $F_{20}$, $F_{21}$, $F_{32}$, and $F_{33}$. Due to the formation of the first structural arrangement 316, the first through fourth transport vehicles 106a-106d occupy the fiducial markers $F_5$, $F_6$, $F_{20}$, and $F_{32}$ (i.e., the third set of fiducial markers) in the second set of fiducial markers $F_5$, $F_6$, $F_{20}$, $F_{21}$, $F_{32}$, and $F_{33}$. The CS 110 may reserve one or more fiducial markers, i.e., the fiducial markers $F_{21}$ and $F_{33}$, in the second set of fiducial markers that remain unoccupied. The fiducial markers $F_{21}$ and $F_{33}$ are reserved by the CS 110 to avoid collision of the first through fourth transport vehicles 106a-106d with other transport vehicles in the storage facility 102. It will be apparent to a person of ordinary skill in the art that the CS 110 continues to determine different minimum bounding boxes similar to the minimum bounding box 502 for different positions of the first through fourth transport vehicles 106a-106d along the optimal path.

The CS 110 may further receive the scan information from the first through fourth transport vehicles 106a-106d, while the first through fourth transport vehicles 106a-106d traverse the optimal path. For example, when the first transport vehicle 106a is moving along the first sub-path, the first transport vehicle 106a notifies the CS 110 every time the first transport vehicle 106a traverses and scans a fiducial marker (such as the fiducial marker $F_5$) included in the first sub-path. The CS 110 further identifies a dropped payload or a damaged fiducial marker in the determined path based on the scan information. In one exemplary scenario, the fiducial marker $F_6$ may have been damaged. Thus, when the second transport vehicle 106b traverses a position where the fiducial marker $F_6$ is present, the second transport vehicle 106b may be unable to scan the fiducial marker $F_6$. Based on the scan information received from the second transport vehicle 106b, the CS 110 may determine that the fiducial marker $F_6$ is damaged as the second transport vehicle 106b failed to scan the fiducial marker $F_6$. The first through fourth transport vehicles 106a-106d continue to move in the first structural arrangement 316 until the first through fourth transport vehicles 106a-106d reach the second location $L_2$, i.e., the end of the determined optimal path.

Figure 5D:
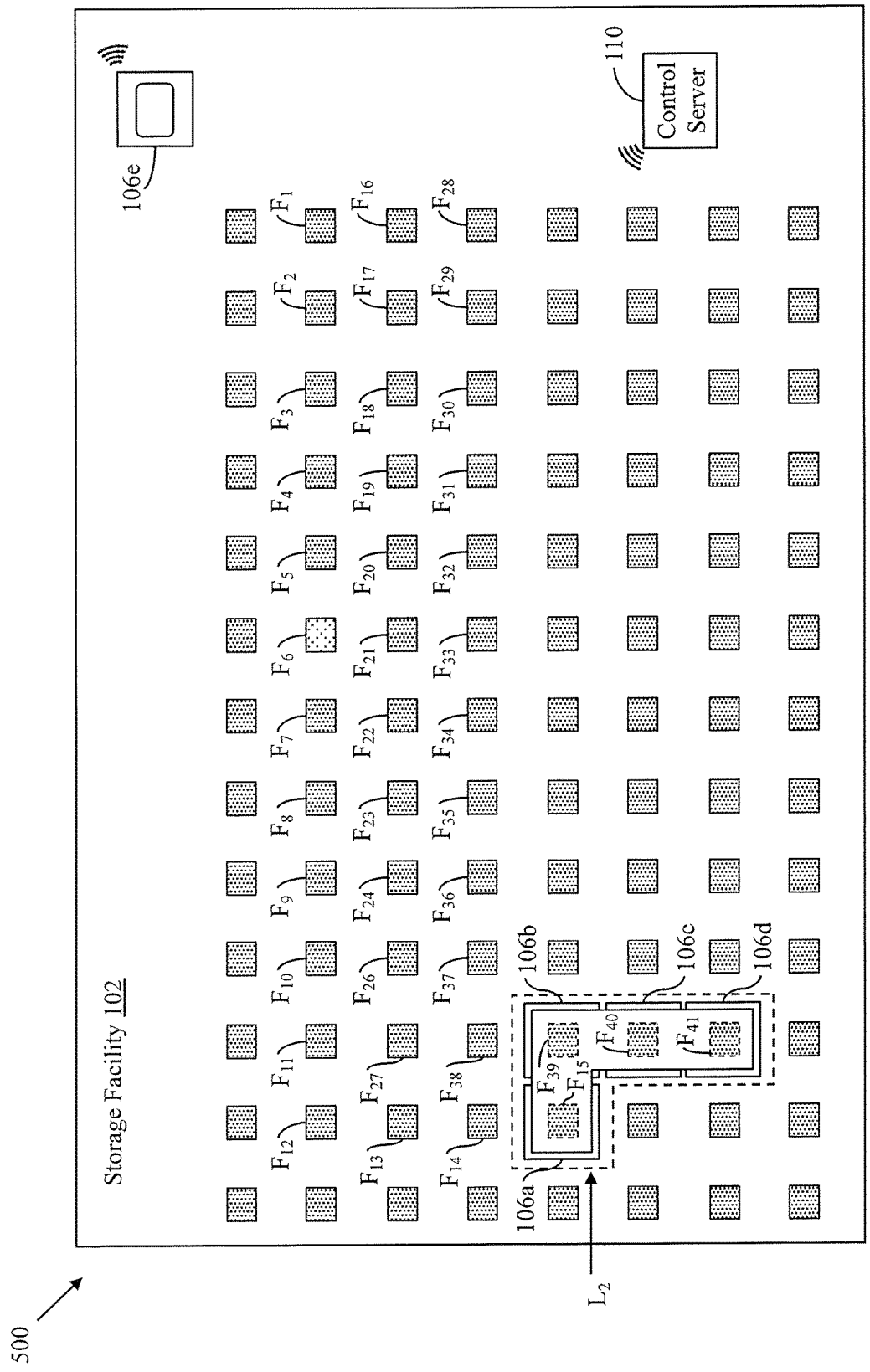

With reference to FIG. 5D, the first through fourth transport vehicles 106a-106d are shown to have reached at the fiducial markers $F_{39}$, $F_{15}$, $F_{40}$, and $F_{41}$, respectively. Based on the real-time location information of the first through fourth transport vehicles 106a-106d, the CS 110 may determine that the first through fourth transport vehicles 106a-106d have reached at the fiducial markers $F_{39}$, $F_{15}$, $F_{40}$, and $F_{41}$ associated with the second location $L_2$. Thus, the CS 110 determines that the first through fourth transport vehicles 106a-106d have transported the first payload 114a to the second location $L_2$. Based on the determination that the first payload 114a is transported to the second location $L_2$, the CS 110 communicates the second set of instructions to the first through fourth transport vehicles 106a-106d to disperse and break out the first structural arrangement 316, and wait for the next task to be assigned.

In one embodiment, when the weight of the first payload 114a is greater than the weight carrying capacity of each of the transport vehicles 106, the CS 110 selects the first set of vehicles (e.g., the first through fourth transport vehicle 106a-106d) for lifting and transporting the first payload 114a. The CS 110 selects the first set of vehicles such that a combined weight carrying capacity of the first set of vehicles is greater than or equal to the weight of the first payload 114a. In another embodiment, the CS 110 may determine that if the first payload 114a is transported by a single transport unit, a COG of the first payload 114a may shift out of a COG tolerance region during transportation. In such a scenario, the CS 110 selects the first set of vehicles for transporting the first payload 114a, and when the first payload 114a is transported by the first set of vehicles, the COG of the first payload 114a remains within the COG tolerance region of the first payload 114a. In some embodiments, the COG tolerance region is determined based on a number of factors including, but not limited to, the COG of the payload, the COG of the transport vehicles, evenness of the floor of the optimal path, or the like.

In some scenarios, the first navigation unit of the first transport vehicle 106a may malfunction while the first through fourth transport vehicles 106a-106d are traversing the determined optimal path by forming the first structural arrangement 316. The malfunction may be caused due to a reset of the first navigation unit, a shutdown of the first navigation unit, or the like. The malfunction may cause the first navigation unit to stop functioning. In a such a scenario, the first transport vehicle 106a may be required to be halted for avoiding a collision with the other transport vehicles. Simultaneously, the second, third, and fourth transport vehicles 106b, 106c, and 106d may also be required to be halted for maintaining the first structural arrangement 316 intact. For preemptively handling such situations involving malfunctions, in some embodiments, the CS 110 may determine timer values for watchdog modules of the first through fourth transport vehicles 106a-106d, and may communicate the timer values to the first through fourth transport vehicles 106a-106d as a part of the SM instructions. The CS 110 may determine the timer values based on the dimensions of the first through fourth transport vehicles 106a-106d, the dimensions of the first payload 114a, the weight of the first payload 114a, the first through fourth velocity profiles of the first through fourth transport vehicles 106a-106d, respectively, and/or the like. Thus, in a scenario of a malfunction, the watchdog modules of the first through fourth transport vehicle 106a-106d are triggered based on the timer values to bring the first through fourth transport vehicles 106a-106d to a halt before the first through fourth transport vehicle 106a-106d collide with each other or any other transport vehicle, or break the first structural arrangement 316.

Figure 6B:
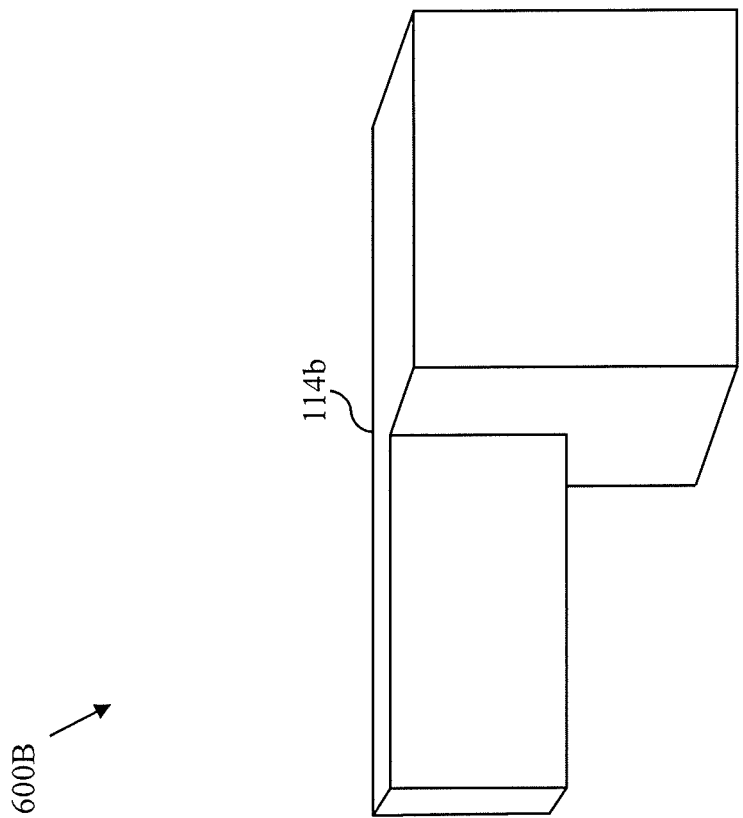
FIG. 6B is a block diagram that illustrates a perspective view of the second payload, in accordance with an exemplary embodiment of the disclosure.
Figure 6A:
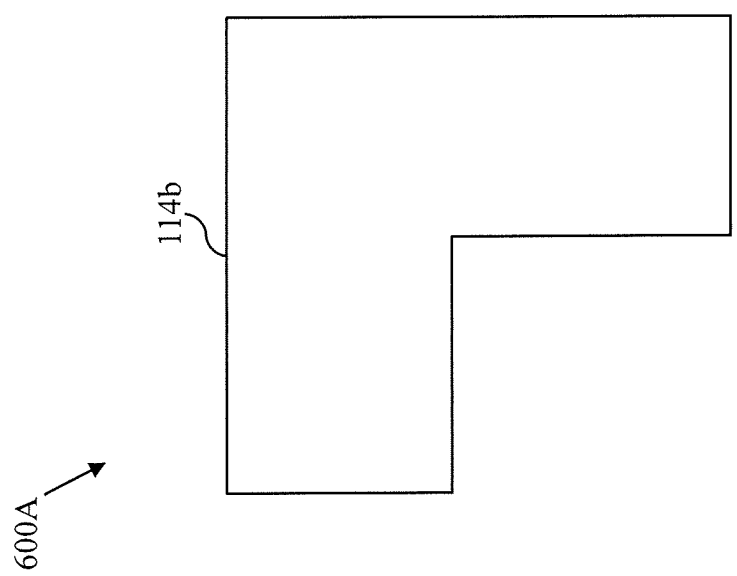
FIG. 6A is a block diagram that illustrates a top view of a second payload of FIG. 1, in accordance with an exemplary embodiment of the disclosure.

FIG. 6A is a block diagram that illustrates a top view 600A of the second payload 114b, in accordance with an exemplary embodiment of the disclosure. As shown in FIG. 6A, the second payload 114b has an uneven shape, size, and dimensions, thus, a single transport vehicle 106 may not be sufficient to transport the second payload 114b. In such a scenario, the CS 110 may determine that the second payload 14b is an irregular payload. The second payload 114b may be an inventory item, a portable storage unit (PSU), or a package in the storage facility 102.

FIG. 6B is a block diagram that illustrates a perspective view 600B of the second payload 114b, in accordance with an exemplary embodiment of the disclosure. As shown in FIG. 6B, a base of the second payload 114b is uneven (i.e., non-uniform). The CS 110 may determine that a structural arrangement including same type of transport vehicles may not be able to lift and transport the second payload 14b in a stabilized manner due to the uneven base of the second payload 114b. In such a scenario, the CS 110 may determine a heterogeneous structural arrangement for transporting the second payload 114b in a stabilized manner. In one embodiment, a heterogeneous structural arrangement may be formed by a combination of pallets and transport vehicles. In another embodiment, a heterogeneous structural arrangement may be formed by a combination of different types of transport vehicles that vary in terms of sizes, dimensions, shapes, weight carrying capacities, and/or heights. Various embodiments of heterogeneous structural arrangements determined by the CS 110 are described in FIGS. 7A, 7B, 8, and 9.

Figures 7A, 7B:
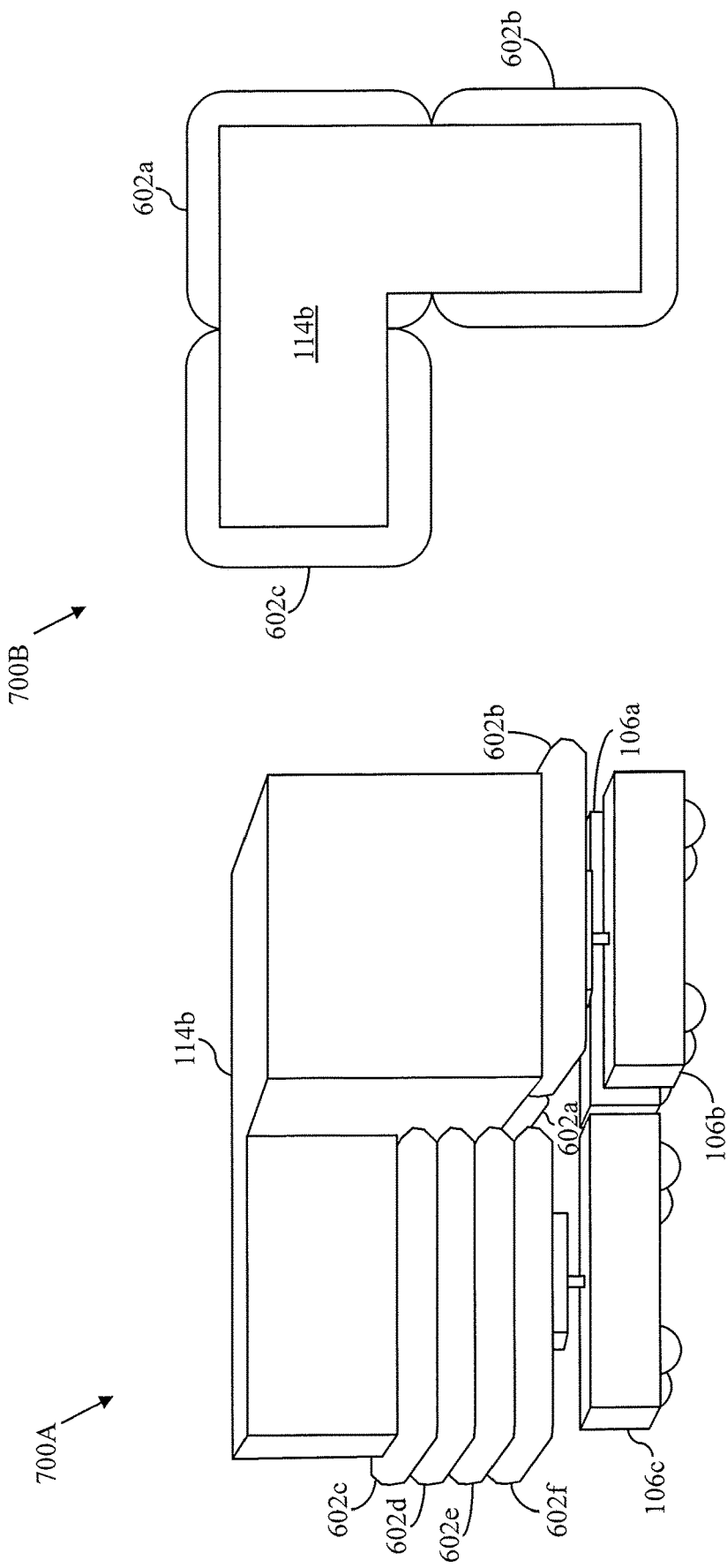
FIG. 7A is a block diagram that illustrates a perspective view of a second structural arrangement formed by a second set of transport vehicles and a set of pallets for transporting the second payload, in accordance with an exemplary embodiment of the disclosure.
FIG. 7B is a block diagram that illustrates a top view of the second structural arrangement formed by the second set of transport vehicles and the set of pallets for transporting the second payload, in accordance with an exemplary embodiment of the disclosure.

FIG. 7A is a block diagram that illustrates a perspective view 700A of a second structural arrangement formed by a second set of transport vehicles and a set of pallets for transporting the second payload 114b, in accordance with an exemplary embodiment of the disclosure. The CS 110 may receive a second request from the external communication server for transporting the second payload 114b from a third location to a fourth location. The second payload 114b may be stationed at the third location and associated with a fourth set of fiducial markers. Since the second payload 114b is an irregular payload having a non-uniform base, the CS 110 may determine the second structural arrangement to be formed at the third location for transporting the second payload 114b. For forming the second structural arrangement at the third location, the CS 110 selects the second set of transport vehicles and the set of pallets. As shown in FIG. 7A, the second set of transport vehicles includes the first through third transport vehicles 106a-106c. The set of pallets include first through sixth pallets 602a-602f. The first through sixth pallets 602a-602f may be arranged horizontally or vertically to form a stable base for holding the second payload 114b. The first through third transport vehicles 106a-106c and the first through sixth pallets 602a-602f, in combination, form the second structural arrangement for lifting and transporting the second payload 114b. Since the second structural arrangement includes a combination the first through third transport vehicles 106a-106c and the first through sixth pallets 602a-602f, the second structural arrangement corresponds to a heterogeneous structural arrangement.

FIG. 7B is a block diagram that illustrates a top view 700B of the second structural arrangement formed by the second set of transport vehicles and the set of pallets for transporting the second payload 114b, in accordance with an exemplary embodiment of the disclosure. It will be apparent to those of skill in the art that other pallets that are in the storage facility 102 may be structurally different from the first through sixth pallets 602a-602f. The pallets may be structurally different due to differences in dimensions, weights, sizes, and/or shapes of the pallets.

Figure 8:
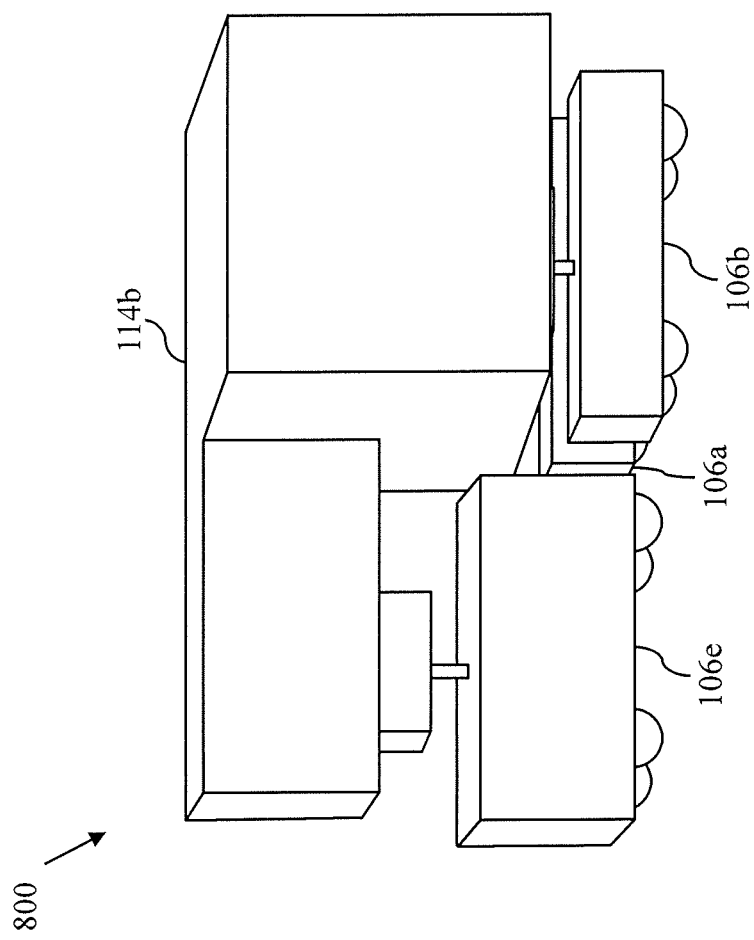
FIG. 8 is a block diagram that illustrates a perspective view of a third structural arrangement formed by a third set of transport vehicles for transporting the second payload, in accordance with another exemplary embodiment of the disclosure.

FIG. 8 is a block diagram that illustrates a perspective view 800 of a third structural arrangement formed by a third set of transport vehicles for transporting the second payload 114b, in accordance with another exemplary embodiment of the disclosure. The third set of transport vehicles may include the first, second, and fifth transport vehicles 106a, 106b, and 106e. The fifth transport vehicle 106e has greater height as compared to the first and second transport vehicles 106a and 106b. The first, second, and fifth transport vehicles 106a, 106b, and 106e may form the third structural arrangement that corresponds to the non-uniform base of the second payload 114b. Thus, the first, second, and fifth transport vehicles 106a, 106b, and 106e, forming the third structural arrangement, are able to lift and transport the second payload 114b without requiring any pallet for stabilizing the base of the second payload 114b. Since the third structural arrangement includes a combination different types of transport vehicles (i.e., the first, second, and fifth transport vehicles 106a, 106b, and 106e), the third structural arrangement corresponds to a heterogeneous structural arrangement.

It will be apparent to a person of ordinary skill in the art that the CS 110 may determine any one of the second structural arrangement (as shown in FIGS. 7A and 7B) or the third structural arrangement (as shown in FIG. 8) for transporting the second payload 114b. For example, the fifth transport vehicle 106e may be unavailable. In such a scenario, the CS 110 may determine the second structural arrangement (as shown in FIGS. 7A and 7B) for transporting the second payload 114b. In another example, the fifth transport vehicle 106e may be available or a required count of pallets for lifting the second payload 114b may be unavailable. In such a scenario, the CS 110 may determine the third structural arrangement (as shown in FIG. 8) for transporting the second payload 114b.

Figure 9:
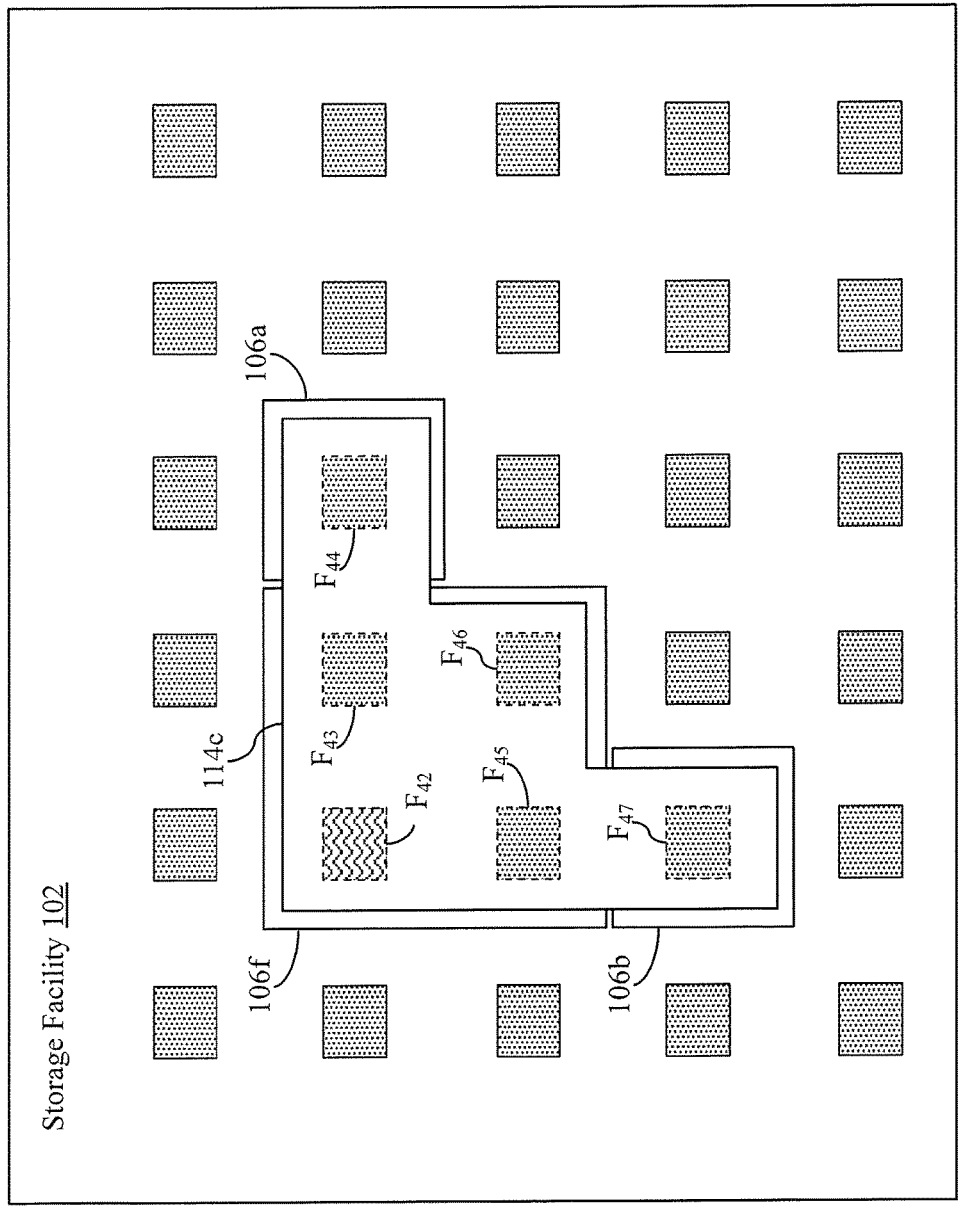
FIG. 9 is a block diagram that illustrates a top view of a fourth structural arrangement formed by a fourth set of transport vehicles for transporting a third payload of FIG. 1, in accordance with an exemplary embodiment of the disclosure.

FIG. 9 is a block diagram that illustrates a top view 900 of a fourth structural arrangement formed by a fourth set of transport vehicles for transporting the third payload 114c, in accordance with an exemplary embodiment of the disclosure. In one exemplary scenario, the CS 110 may receive a third request from the external communication server for transporting the third payload 114c from one location to another location. The third payload 114c may be an irregular payload and associated with fiducial markers $F_{42}$, $F_{43}$, $F_{44}$, $F_{45}$, $F_{46}$, and $F_{47}$. Thus, the CS 110 determines the fourth structural arrangement for transporting the third payload 114c. Based on the determination of the fourth structural arrangement, the CS 110 may select the first, second, and sixth transport vehicles 106a, 106b, and 106f to form the fourth structural arrangement. Based on the instructions received from the CS 110, the first, second, and sixth transport vehicles 106a, 106b, and 106f may form the fourth structural arrangement at the current location of the third payload 114c for lifting the third payload 114c. In the fourth structural arrangement, the first and second transport vehicles 106a and 106b are adjacent to the sixth transport vehicle 106f. As shown in FIG. 9, the first and second transport vehicles 106a and 106b occupy one fiducial marker each $F_{44}$ and $F_{47}$, whereas the sixth transport vehicle 106f occupies four fiducial markers (i.e., the fiducial markers $F_{42}$, $F_{43}$, $F_{45}$, and $F_{46}$) as the size of the sixth transport vehicle 106f is greater than the sizes of the first and second transport vehicles 106a and 106b. Since the fourth structural arrangement includes a combination of the first, second, and sixth transport vehicles 106a, 106b, and 106f having different sizes, the fourth structural arrangement corresponds to a heterogeneous structural arrangement.

At any time-instance, the sixth transport vehicle 106f occupies four fiducial markers. Thus, the CS 110 may be configured to determine a master marker for the sixth transport vehicle 106f. For example, from the four fiducial markers $F_{42}$, $F_{43}$, $F_{45}$, and $F_{46}$ occupied by the sixth transport vehicle 106f, the CS 110 may designate one fiducial marker (such as the fiducial marker $F_{42}$) as the master marker, and the remaining three markers (i.e., the fiducial markers $F_{43}$, $F_{45}$, and $F_{46}$) may be designated as slave markers. Likewise, the CS 110 may determine a set of master markers along a sub-path of the sixth transport vehicle 106f for facilitating the movement of the sixth transport vehicle 106f along the respective sub-path. The CS 110 may communicate information pertaining to the determined set of master markers to the sixth transport vehicle 106f. In one scenario, if a designated master marker is determined to be damaged, the CS 110 may designate a slave marker as a new master marker. After forming the fourth structural arrangement, the first, second, and sixth transport vehicles 106a, 106b, and 106f may transport the third payload 114c to the desired location.

FIG. 10 is a block diagram that illustrates the CS 110, in accordance with an exemplary embodiment of the disclosure. The CS 110 may include a processor 1002, a database 1004, and a transceiver 1006 that communicate with each other by way of a first communication bus 1008. The processor 1002 may include an inventory manager 1010, a request handler 1012, a layout manager 1014, an arrangement identifier 1016, a route identifier 1018, and an allocation manager 1020 that communicate with each other by way of a second communication bus 1022. It will be apparent to a person having ordinary skill in the art that the CS 110 is shown for illustrative purposes and not limited to any specific combination of hardware circuitry and software.

The processor 1002 may include suitable logic, instructions, circuitry, interfaces, and/or code, executable by the circuitry, for implementing various operations such as inventory management operations, item procurement operations, order fulfilment operations, or the like. In one embodiment, the processor 1002 may be configured to identify the optimal paths (as described in FIGS. 5A-5D) and determine the structural arrangements (as described in FIGS. 1-9) for facilitating transportation of the payloads 114 in the storage facility 102. Examples of the processor 1002 include, but are not limited to, an application-specific integrated circuit (ASIC) processor, a reduced instruction set computing (RISC) processor, a complex instruction set computing (CISC) processor, a field-programmable gate array (FPGA), and the like.

The database 1004 includes suitable logic, instructions, circuitry, interfaces, and/or code, executable by the circuitry, to store an inventory list 1024, layout information 1026, inventory storage data 1028, and transport vehicle data 1030. Examples of the database 1004 include a random-access memory (RAM), a read-only memory (ROM), a removable storage drive, a hard disk drive (HDD), a flash memory, a solid-state memory, and the like. In one embodiment, the database 1004 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the database 1004 in the CS 110, as described herein. In other embodiments, the database 1004 may be realized in form of an external database server or a cloud storage working in conjunction with the CS 110, without departing from the scope of the disclosure.

The inventory list 1024 may include a list of inventory items stored in the storage facility 102 and a number of units of each inventory item stored in the storage facility 102. The layout information 1026 includes the virtual map of the storage facility 102. The virtual map may include information pertaining to the layout of the storage facility 102, such as the locations of the fiducial markers. The layout information 1026 may be further indicative of the associations between the payloads 114 (i.e., the inventory items, the packages, and the PSUs) and the fiducial markers in the storage facility 102. For example, as per the layout information 1026, the first payload 114*a* is associated with the fiducial markers $F_1$, $F_2$, $F_{16}$, and $F_{28}$ when the first payload 114*a* is stationed at the first location $L_1$ (as shown in FIG. 5A) and occupies a space encompassing the fiducial markers $F_1$, $F_2$, $F_{16}$, and $F_{28}$. The layout information 1026 further includes real-time path availability information of various paths in the storage facility 102. For example, the layout information 1026 may indicate that one or more paths in the storage facility 102 are closed down for maintenance.

The inventory storage data 1028 may include the details of the inventory items and/or the packages stored in the storage area 104. The inventory storage data 1028 may further include the details of the PSUs in the storage area 104. Based on the inventory storage data 1028, the CS 110 may determine the set of parameters (i.e., a size, dimensions, a weight, a shape, or the like) of each of the payloads 114 (for example, the inventory items, the packages, and/or the PSUs).

The transport vehicle data 1030 may be indicative of the details of the transport vehicles 106 present in the storage facility 102. The details of each of the transport vehicles 106 may include a size, dimensions, a weight carrying capacity, a maximum and minimum speed of the transport vehicle, or the like. The details may further include an identifier (such as a numeric or an alpha-numeric code) associated with the transport vehicle, real-time information such as a real-time location, an indicator that indicates whether the transport vehicle is carrying a payload, a weight of the payload, or the like. The transport vehicle data 1030 may also indicate whether any of the transport vehicles 106 are moving synchronously in a structural arrangement and in a leader-follower configuration.

The transceiver 1006 may transmit and receives data over the communication network 112 using one or more communication network protocols. The transceiver 1006 may transmit various requests and instructions to the transport vehicles 106 and the operator station 108 and receives requests and information from the transport vehicles 106 and the operator station 108. Examples of the transceiver 1006 may include, but are not limited to, an antenna, a radio frequency transceiver, a wireless transceiver, a Bluetooth transceiver, an Ethernet based transceiver, a universal serial bus (USB) transceiver, or any other device configured to transmit and receive data.

The processor 1002 may perform various operations in the storage facility 102 by way of the inventory manager 1010, the request handler 1012, the layout manager 1014, the arrangement identifier 1016, the route identifier 1018, and the allocation manager 1020. The inventory manager 1010 may manage the inventory list 1024 stored in the database 1004. For example, the inventory manager 1010 may add new inventory items to the inventory list 1024 when the new inventory items are stored in the storage area 104 and updates the inventory list 1024 whenever there is any change in regards to the inventory items stored in the storage area 104 (e.g., when items are retrieved from the PSUs for fulfilment of orders).

The request handler 1012 may process all the requests received from the external communication server. The request handler 1012 may identify, based on the received requests (such as the first request), inventory items pertinent to the requests. The request handler 1012 may further identify the PSUs that store the inventory items associated with the requests. The request handler 1012 may further communicate, for fulfilment of the requests, the details regarding the inventory items to the operator station 108. In one embodiment, when the storage facility 102 does not have all inventory items specified in a request, the request handler 1012 may queue the request for a specific-time interval until the storage facility 102 receives all the inventory items specified in the request. In one embodiment, the request handler 1012 merges various requests (such as the first and second requests) to optimize fulfilment of the requests.

The layout manager 1014 may manage the layout information 1026. For example, if there is any change in the layout of the storage facility 102 (such as a change in the arrangement of the PSUs or individual inventory items), the layout manager 1014 updates the layout information 1026 based on the change in the layout. The arrangement identifier 1016 may be configured to determine the structural arrangements required for transporting irregular payloads (as described in the foregoing description of FIGS. 1-9).

The route identifier 1018 may be responsible for determining the optimal paths. The route identifier 1018 may further identify sub-paths (such as the first through fourth sub-paths) based on the transport vehicles that form the determined structural arrangement. The route identifier 1018 may further determine likelihood of collisions between the transport vehicles 106. Based on the determination of the likelihood of collisions, the route identifier 1018 identifies alternative paths and performs cost-benefit analyses. Further, the route identifier 1018 may determine safe distances (such as the first safe distances) to be maintained by the transport vehicles 106, therebetween, while traversing in the determined path. The route identifier 1018 may further determine minimum bounding boxes (e.g., the minimum bounding box 502 of FIG. 5C) when the transport vehicles 106 traverse the optimal path by forming a determined structural arrangement, and reserves one or more unoccupied fiducial markers associated with the minimum bounding boxes.

The allocation manager 1020 may handle the allocation of the transport vehicles 106 to one or more payloads (such as the payloads 114) based on the received requests. For example (as described in FIGS. 5A-5D), the allocation manager 1020 may select the first through fourth transport vehicles 106*a*-106*d* that are available for forming the first structural arrangement 316, and allocates the task of transporting the first payload 114*a* to the first through fourth transport vehicles 106*a*-106*d*.

Though, the processor 1002 is depicted as a hardware component in FIG. 10, a person skilled in the art will appreciate that the scope of the disclosure is not limited to realizing the processor 1002 as the hardware component. In another embodiment, the functionality of the processor 1002 may be implemented by way of a computer executable code or a set of computer readable instructions stored in the database 1004, without deviating from the spirit of the disclosure.

Figure 11:
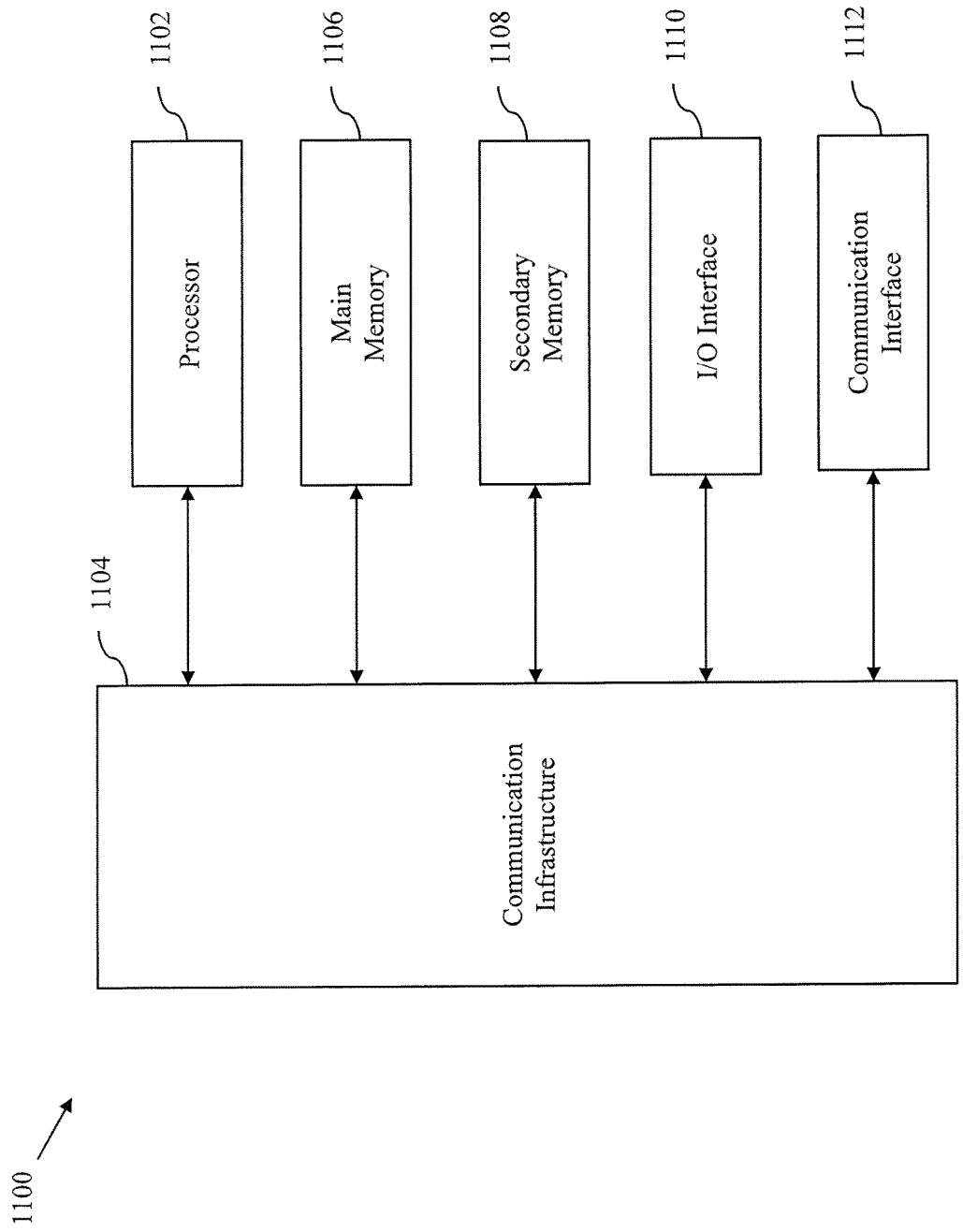
FIG. 11 is a block diagram that illustrates system architecture of a computer system, in accordance with an exemplary embodiment of the disclosure.

FIG. 11 is a block diagram that illustrates system architecture of a computer system 1100, in accordance with an exemplary embodiment of the disclosure. An embodiment of the disclosure, or portions thereof, may be implemented as computer readable code on the computer system 1100. In one example, the transport vehicles 106 and the operator station 108 may be implemented in the computer system 1100. Hardware, software, or any combination thereof may embody modules and components used to implement methods of FIGS. 12A and 12B. The computer system 1100 includes a processor 1102 that may be connected to a communication infrastructure 1104. The computer system 1100 may further include a main memory 1106 and a secondary memory 1108. The computer system 1100 may further include an input/output (I/O) interface 1110 and a communication interface 1112. The communication interface 1112 may allow data transfer between the computer system 1100 and various devices that are communicatively coupled to the computer system 1100.

Figure 12A:
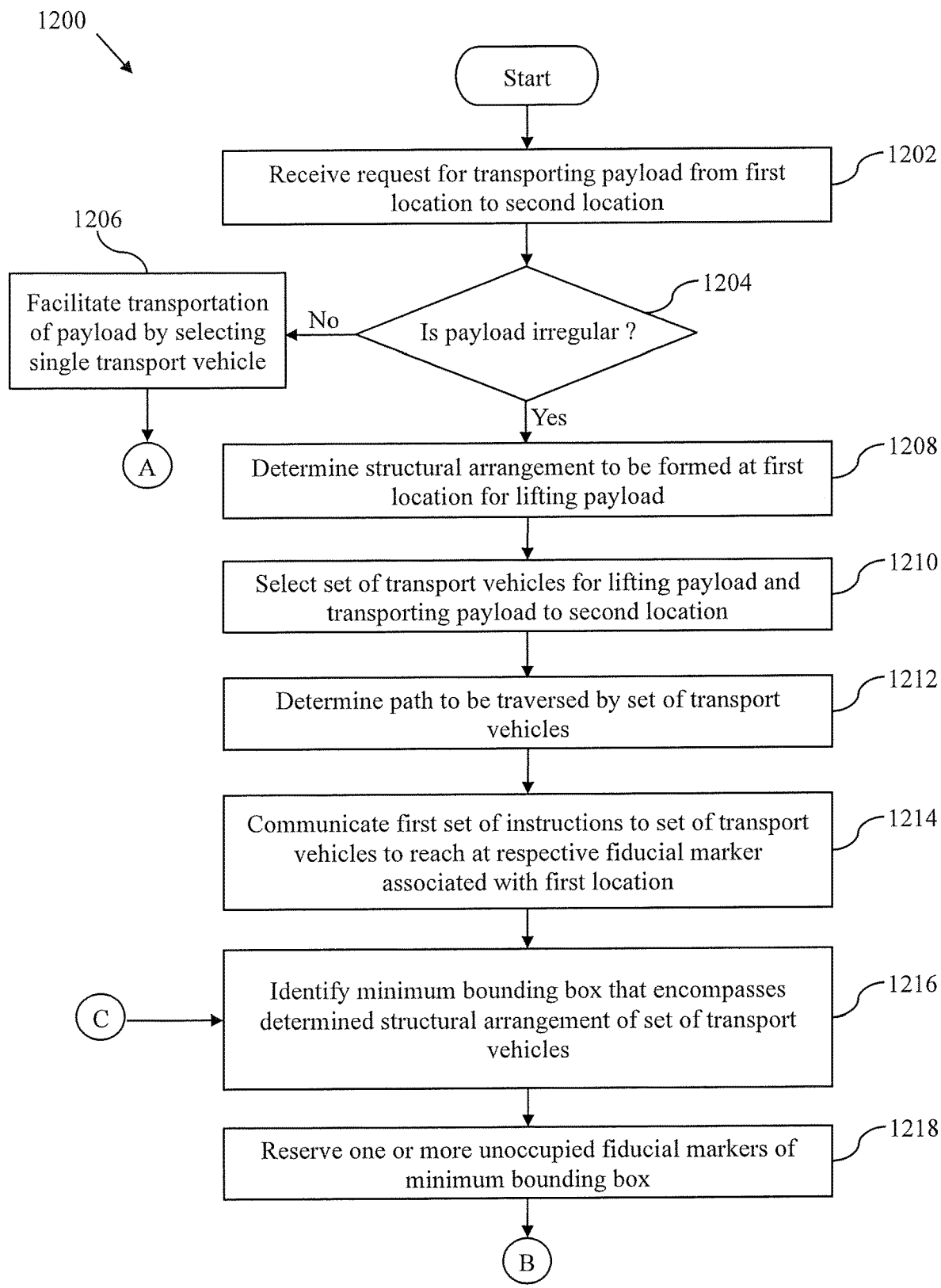
FIGS. 12A and 12B, collectively represent a flow chart that illustrates a process for transporting a payload in the storage facility, in accordance with an exemplary embodiment of the disclosure.
Figure 12B:
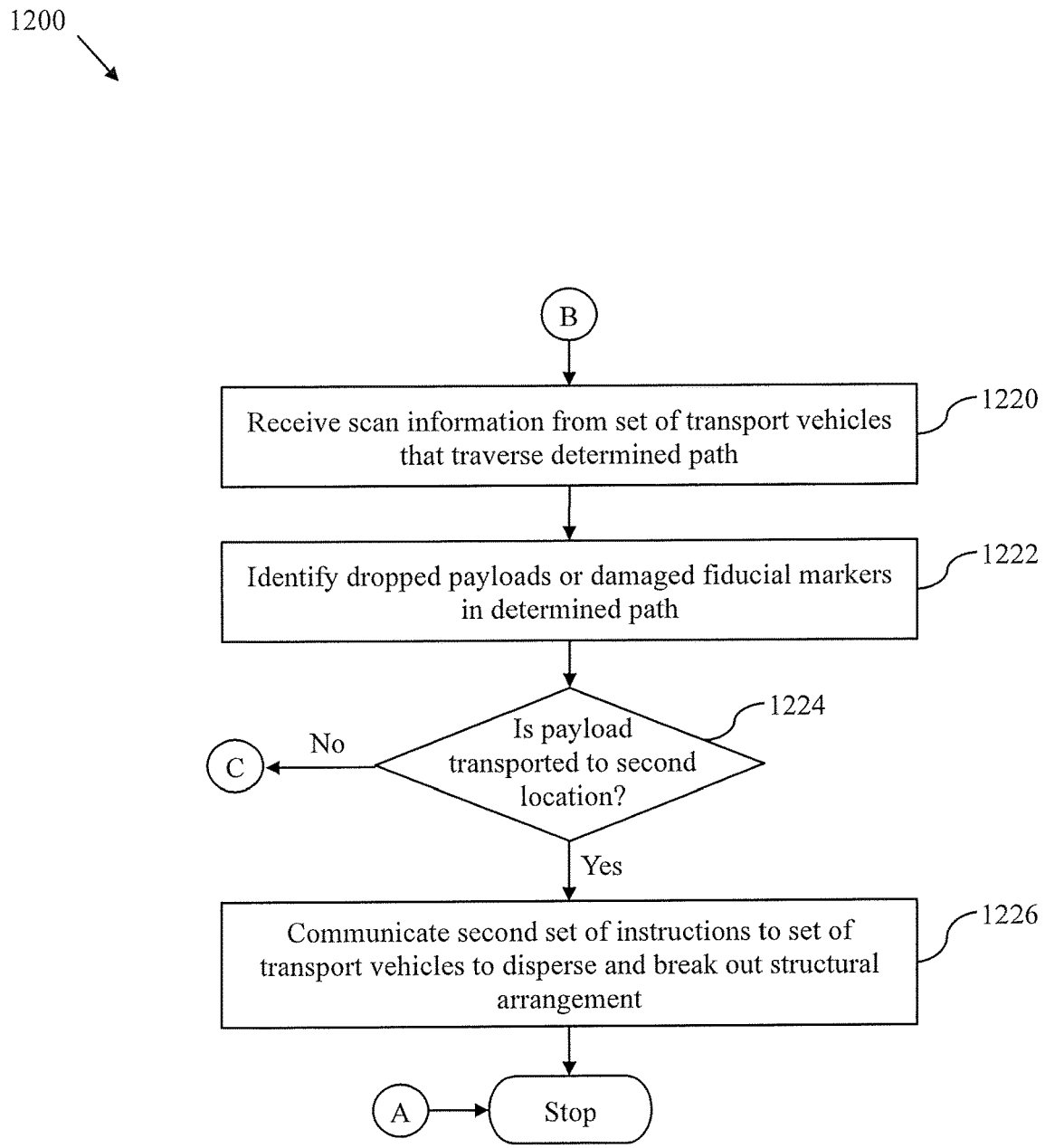

FIGS. 12A and 12B, collectively represent a flow chart 1200 that illustrates a process (e.g., a method) for transporting a payload in the storage facility 102, in accordance with an exemplary embodiment of the disclosure. In some embodiments, the process may be performed by the CS 110. FIGS. 12A and 12B are explained in conjunction with FIGS. 5A-5D.

The process may generally start at step 1202, where the CS 110 receives a request for transporting a payload (e.g., the first payload 114a) from the first location $L_1$ to the second location $L_2$. The process proceeds to step 1204, where the CS 110 determines whether the first payload 114a is an irregular payload. The CS 110 may determine whether the first payload 114a is an irregular payload based on the first set of parameters associated with the first payload 114a. If at step 1204, it is determined that the first payload 114a is not an irregular payload, the process proceeds to step 1206. At step 1206, the CS 110 facilitates the transportation of the first payload 114a by selecting a single transport vehicle. The process then proceeds to process A (as shown in FIG. 12B) and the process illustrated in FIGS. 12A and 12B stops.

If at step 1204, it is determined that the first payload 114a is an irregular payload, the process proceeds to step 1208. At step 1208, the CS 110 determines the structural arrangement (e.g., the first structural arrangement 316 of FIG. 4A) to be formed at the first location $L_1$ for lifting the first payload 114a. The CS 110 determines the structural arrangement based on the first set of parameters associated with the first payload 114a. The process proceeds to step 1210, where the CS 110 selects a set of transport vehicles for lifting the first payload 114a and transporting the first payload 114a to the second location $L_2$. The CS 110 selects the first set of transport vehicles from the transport vehicles 106 available in the storage facility 102. The process proceeds to step 1212, where the CS 110 determines a path to be traversed by the selected set of transport vehicles for transporting the first payload 114a while maintaining the structural arrangement.

The process proceeds to step 1214, where the CS 110 communicates the first set of instructions to the selected set of transport vehicles to reach at the respective fiducial markers associated with the first location $L_1$. Based on the first set of instructions, the selected set of transport vehicles reaches at the respective fiducial markers to form the determined structural arrangement. For transporting the lifted first payload 114a, the selected set of transport vehicles moves in sync with respect to each other along the determined path while maintaining the determined structural arrangement. The process proceeds to step 1216, where the CS 110 identifies the minimum bounding box that encompasses the determined structural arrangement of the selected set of transport vehicles when the selected set of transport vehicles traverses the determined path. The minimum bounding box may be associated with the second set of fiducial markers. The selected set of transport vehicles may occupy the third set of fiducial markers of the second set of fiducial markers. The process proceeds to step 1218, where the CS 110 reserves the one or more unoccupied fiducial markers of the minimum bounding box. For example, the CS 110 reserves those fiducial markers in the second set of fiducial markers that remain unoccupied. The process proceeds to process B.

With reference to FIG. 12B, the process B proceeds to step 1220, where the CS 110 receives the scan information from the selected set of transport vehicles that traverses the determined path. The selected set of transport vehicles communicates the scan information to the CS 110 by scanning the fiducial markers associated with the determined path. The process proceeds to step 1222, where the CS 110 identifies dropped payloads or damaged fiducial markers in the determined path based on the scan information. The process proceeds to step 1224, where the CS 110 determines whether the first payload 114a is transported to the second location $L_2$. If at step 1224, it is determined that the first payload 114a is not transported to the second location $L_2$, the process proceeds to process C (as shown in FIG. 12A) and then the process C proceeds to step 1216. If at step 1224, it is determined that the first payload 114a is transported to the second location $L_2$, the process proceeds to step 1226. At step 1226, the CS 110 further communicates the second set of instructions to the selected set of transport vehicles instructing the selected set of transport vehicles to disperse and break out the structural arrangement. After step 1226 is performed, the process illustrated in FIGS. 12A and 12B stops.

Technical improvements in the CS 110 enable the CS 110 to determine a structural arrangement that is required to be formed by a set of transport vehicles for transporting an irregular payload (such as the first payload 114a) from one location to another location. Examples of such structural arrangements are shown in FIGS. 4A-9. By facilitating a synchronous movement of the set of transport vehicles, the CS 110 ensures that the determined structural arrangement is always maintained by the set of transport vehicles when the set of transport vehicles transports the irregular payload along the determined path. Hence, the CS 110 and the transport vehicles 106 overcome a need for customized transport vehicles in the storage facility 102 for transporting irregular payloads, thereby improving the revenue, a throughput, and/or an efficiency of the operations performed at the storage facility 102. The system of the present disclosure is scalable and flexible as the type of transport vehicles 106 required in the storage facility 102 is independent of the types of payloads 114. Further, for implementing the method of present disclosure, inter-vehicle communication is not required, i.e., the transport vehicles 106 are not required to communicate with each other. Therefore, communication overheads between the transport vehicles 106 can be avoided. This results in reduced complexity and increased reliability of the transport vehicles 106. The CS 110 further identifies a dropped payload or a damaged fiducial marker based on the scan information received from the transport vehicles 106. The dropped payload may be picked or the damaged fiducial marker may be replaced, thus, increasing the throughput of the inventory management operations.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for transporting a payload in a storage facility. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for transporting a payload in a storage facility, the method comprising:
    determining, by a server based on a first set of parameters associated with the payload, a structural arrangement to be formed at a first location in the storage facility for lifting the payload, wherein the payload is stationed at the first location and is associated with a first plurality of fiducial markers;
    selecting, by the server based on the determined structural arrangement, a plurality of transport vehicles in the storage facility for lifting the payload and transporting the payload from the first location to a second location in the storage facility;
    determining, by the server, a path to be traversed by the plurality of transport vehicles for transporting the payload to the second location while maintaining the determined structural arrangement; and
    communicating, by the server, a plurality of instructions to the plurality of transport vehicles to reach a respective fiducial marker of the first plurality of fiducial markers;
    wherein, based on the plurality of instructions, the plurality of transport vehicles reach the respective fiducial markers to form the determined structural arrangement for lifting the payload; and
    wherein the plurality of transport vehicles move in sync with respect to each other along the determined path for transporting the lifted payload while maintaining the determined structural arrangement.

2. The method of claim 1, further comprising:
    receiving, by the server, a request for transporting the payload from the first location to the second location; and
    determining, by the server, whether the payload is an irregular payload based on the first set of parameters, wherein the structural arrangement is determined when the payload is determined to be the irregular payload.

3. The method of claim 1, further comprising:
    identifying, by the server, a minimum bounding box that encompasses the determined structural arrangement of the plurality of transport vehicles, wherein the minimum bounding box is associated with a second plurality of fiducial markers, and wherein the plurality of transport vehicles occupy a third plurality of fiducial markers of the second plurality of fiducial markers; and
    reserving, by the server, one or more remaining fiducial markers of the second plurality of fiducial markers that remain unoccupied.

4. The method of claim 1, wherein the first set of parameters includes at least one of first dimensions of the payload, a weight of the payload, a size of the payload, and a shape of the payload.

5. The method of claim 1, wherein the plurality of transport vehicles are selected by the server further based on a second set of parameters associated with each of the plurality of transport vehicles.

6. The method of claim 5, wherein the second set of parameters includes at least one of a weight carrying capacity, first dimensions, a shape, and a height of each of the plurality of transport vehicles.

7. The method of claim 1, wherein the plurality of transport vehicles traverse the determined path in a leader-follower configuration.

8. The method of claim 1, wherein the movement of the plurality of transport vehicles is such that adjacent transport vehicles in the determined structural arrangement have a predetermined safe distance therebetween.

9. The method of claim 8, wherein the predetermined safe distance is zero and the adjacent transport vehicles in the determined structural arrangement are in contact with each other.

10. The method of claim 1, wherein the determined path includes a plurality of sub-paths each associated with a transport vehicle of the plurality of transport vehicles, and wherein the plurality of transport vehicles traverse the respective sub-paths for transporting the payload from the first location to the second location, while maintaining the determined structural arrangement.

11. The method of claim 1, further comprising
    receiving, by the server, scan information from the plurality of transport vehicles that traverse the determined path, wherein the plurality of transport vehicles communicate the scan information to the server by scanning a set of fiducial markers associated with the determined path; and
    identifying, by the server, a dropped payload or a damaged fiducial marker in the determined path based on the scan information.

12. A system for transporting a payload in a storage facility, the system comprising:
    a first plurality of transport vehicles in the storage facility; and
    a server in communication with the first plurality of transport vehicles, wherein the server is configured to:
        determine, based on a first set of parameters associated with the payload, a structural arrangement to be formed at a first location in the storage facility for lifting the payload, wherein the payload is stationed at the first location and is associated with a first plurality of fiducial markers;

select, based on the determined structural arrangement, a second plurality of transport vehicles from the first plurality of transport vehicles for lifting the payload and transporting the payload from the first location to a second location in the storage facility;

determine a path to be traversed by the second plurality of transport vehicles for transporting the payload to the second location, while maintaining the determined structural arrangement; and communicate a plurality of instructions to the second plurality of transport vehicles to reach at a respective fiducial marker of the first plurality of fiducial markers;

wherein, based on the plurality of instructions, the second plurality of transport vehicles reach at the respective fiducial markers to form the determined structural arrangement for lifting the payload, and wherein the second plurality of transport vehicles move in sync with respect to each other along the determined path for transporting the lifted payload, while maintaining the determined structural arrangement.

13. The system of claim 12, wherein the server is further configured to:
receive a request for transporting the payload from the first location to the second location, and
determine whether the payload is an irregular payload based on the first set of parameters, wherein the structural arrangement is determined when the payload is the irregular payload.

14. The system of claim 12, wherein the server is further configured to:
identify a minimum bounding box that encompasses the determined structural arrangement of the second plurality of transport vehicles, wherein the minimum bounding box is associated with a second plurality of fiducial markers, and wherein the second plurality of transport vehicles occupy a third plurality of fiducial markers of the second plurality of fiducial markers, and reserve one or more remaining fiducial markers of the second plurality of fiducial markers that remain unoccupied.

15. The system of claim 12, wherein the server selects the second plurality of transport vehicles further based on a second set of parameters associated with each of the first plurality of transport vehicles.

16. The system of claim 15, wherein the first set of parameters includes at least one of first dimensions of the payload, a weight of the payload, a size of the payload, and a shape of the payload, and wherein the second set of parameters includes at least one of a weight carrying capacity, second dimensions, a height, and a shape of each of the first plurality of transport vehicles.

17. The system of claim 12, wherein the second plurality of transport vehicles are configured to traverse the determined path in a leader-follower configuration, and wherein the movement of the second plurality of transport vehicles is such that adjacent transport vehicles in the determined structural arrangement have a predetermined safe distance therebetween.

18. The system of claim 17, wherein the predetermined safe distance is zero and the adjacent transport vehicles in the determined structural arrangement are in contact with each other.

19. The system of claim 12, wherein the determined path includes a plurality of sub-paths each associated with a transport vehicle of the second plurality of transport vehicles, and wherein the second plurality of transport vehicles traverse the respective sub-paths for transporting the payload from the first location to the second location, while maintaining the determined structural arrangement.

20. The system of claim 12, wherein the server is further configured to:
receive scan information from the second plurality of transport vehicles that traverse the determined path, wherein the second plurality of transport vehicles communicate the scan information to the server by scanning a set of fiducial markers associated with the determined path, and
identify a dropped payload or a damaged fiducial marker in the determined path based on the scan information.

* * * * *